United States Patent
Sugihara et al.

(10) Patent No.: US 9,953,767 B2
(45) Date of Patent: Apr. 24, 2018

(54) CONDUCTIVE POLYMER DISPERSION LIQUID, A CONDUCTIVE POLYMER, AND USE THEREOF

(71) Applicant: TAYCA CORPORATION, Osaka-shi, Osaka (JP)

(72) Inventors: Ryosuke Sugihara, Osaka (JP); Kei Hirota, Osaka (JP); Kazuto Fujihara, Osaka (JP)

(73) Assignee: TAYCA CORPORATION, Osaka (JP)

( * ) Notice: Subject to any disclaimer, the term of this patent is extended or adjusted under 35 U.S.C. 154(b) by 60 days.

(21) Appl. No.: 15/284,072

(22) Filed: Oct. 3, 2016

(65) Prior Publication Data
US 2017/0025227 A1    Jan. 26, 2017

Related U.S. Application Data

(62) Division of application No. 14/342,757, filed as application No. PCT/JP2012/071415 on Aug. 24, 2012, now Pat. No. 9,460,860.

(30) Foreign Application Priority Data

Sep. 6, 2011 (JP) ................. 2011-193473
Feb. 7, 2012 (JP) ................. 2012-023622

(51) Int. Cl.
| | |
|---|---|
| *H01B 1/00* | (2006.01) |
| *H01G 9/00* | (2006.01) |
| *C09D 5/24* | (2006.01) |
| *H01G 9/028* | (2006.01) |
| *H01B 1/12* | (2006.01) |
| *C08L 65/00* | (2006.01) |
| *H01G 9/15* | (2006.01) |
| *C08G 8/18* | (2006.01) |
| *H01G 11/48* | (2013.01) |
| *C08F 12/30* | (2006.01) |
| *C08L 25/18* | (2006.01) |
| *C09D 125/02* | (2006.01) |
| *C09D 165/00* | (2006.01) |
| *H01G 9/07* | (2006.01) |
| *C08L 61/14* | (2006.01) |

(52) U.S. Cl.
CPC ............. *H01G 9/028* (2013.01); *C08F 12/30* (2013.01); *C08G 8/18* (2013.01); *C08L 25/18* (2013.01); *C08L 65/00* (2013.01); *C09D 5/24* (2013.01); *C09D 125/02* (2013.01); *C09D 165/00* (2013.01); *H01B 1/127* (2013.01); *H01G 9/0036* (2013.01); *H01G 9/07* (2013.01); *H01G 9/15* (2013.01); *H01G 11/48* (2013.01); *C08G 2261/3223* (2013.01); *C08G 2261/51* (2013.01); *C08G 2261/794* (2013.01); *C08L 61/14* (2013.01); *C08L 2201/10* (2013.01); *C08L 2201/54* (2013.01); *C08L 2203/20* (2013.01); *Y02E 60/13* (2013.01)

(58) Field of Classification Search
CPC . H01B 1/00; H01B 1/127; C09D 5/24; C08K 2201/001
See application file for complete search history.

(56) References Cited

U.S. PATENT DOCUMENTS

| | | | |
|---|---|---|---|
| 4,010,117 A | | 3/1977 | Maruhashi et al. |
| 9,460,860 B2 * | | 10/2016 | Sugihara ................. C08L 65/00 |
| 2008/0105854 A1 | | 5/2008 | Huh et al. |
| 2010/0284129 A1 | | 11/2010 | Sugihara et al. |

FOREIGN PATENT DOCUMENTS

| | | |
|---|---|---|
| JP | 08-041321 A | 2/1996 |
| JP | 2636968 B2 | 8/1997 |
| JP | 2003-160647 A | 6/2003 |
| JP | 2004-265927 A | 9/2004 |
| JP | 3906071 B2 | 4/2007 |
| JP | 2007-277569 A | 10/2007 |
| JP | 4573363 B1 | 11/2010 |
| WO | 2009/131011 A | 10/2009 |
| WO | 2009/131012 A1 | 10/2009 |
| WO | 2010/095648 A | 8/2010 |
| WO | 2010/095649 A1 | 8/2010 |
| WO | 2010/095650 A1 | 8/2010 |
| WO | 2010/095651 A1 | 8/2010 |
| WO | 2010/095652 A1 | 8/2010 |

OTHER PUBLICATIONS

International Search Report for PCT/JP2012/071415; dated Nov. 27, 2012.

* cited by examiner

*Primary Examiner* — Mark Kopec
(74) *Attorney, Agent, or Firm* — Westerman, Hattori, Daniels & Adrian, LLP

(57) ABSTRACT

There is provided a conductive polymer having high conductivity with excellent heat resistance. Using the conductive polymer, there can be provided solid electrolytic capacitors having low ESR, high reliability, and less leakage current. There can be also provided conductive films having high conductivity and superior heat resistance. There is provided a conductive polymer dispersion liquid obtained by a method in which in the presence of a copolymer from styrenesulfonic acid, and at least one kind of a non-sulfonic acid monomer selected from the group consisting of methacrylate, acrylate, and an unsaturated hydrocarbon containing alkoxysilane compound or its hydrolysate, thiophene or its derivative is polymerized by oxidation polymerization in water, or in an aqueous solution comprising a mixture of water and a water miscible solvent to produce the conductive polymer dispersion liquid. Using the conductive polymer as solid electrolyte, a solid electrolyte capacitor can be provided. Also, using the conductive polymer, a conductive film can be provided.

16 Claims, No Drawings

CONDUCTIVE POLYMER DISPERSION LIQUID, A CONDUCTIVE POLYMER, AND USE THEREOF

CROSS-REFERENCE TO RELATED APPLICATION

The application is a Divisional of U.S. patent application Ser. No. 14/342,757, filed on Mar. 4, 2014 now U.S. Pat. No. 9,460,860, which is a 371 of International Application No. PCT/JP2012/071415, filed on Aug. 24, 2012, the entire contents of which are incorporated herein by reference.

TECHNICAL FIELD

The present invention relates to a conductive polymer dispersion liquid, and a conductive polymer obtained by drying the conductive polymer dispersion liquid. Also, the present invention relates to the use thereof; that is, the use as e.g., a solid electrolytic capacitor using the conductive polymer as solid electrolyte and a conductive film made of the conductive polymer.

Because of high conductivity, a conductive polymer is used as a solid electrolyte of a solid electrolytic capacitor such as tantalum solid electrolytic capacitor, niobium solid electrolytic capacitor and aluminum solid electrolytic capacitor.

In such applications, the example of a conductive polymer can be obtained by synthesis by means of oxidation polymerization of polymerizable monomers such as thiophene or its derivative.

Serving as a dopant in the oxidation polymerization of the polymerizable monomers such as thiophene or its derivative, and in particular in performing chemical oxidation polymerization of such monomers, an organic sulfonic acid is mainly used. In particular, it is said that an aromatic sulfonic acid is suitable. An oxidant is a transition metal as used. In particular, it is said that ferric compound is suitable. Usually, a ferric salt of an aromatic sulfonic acid is used as an oxidant and dopant agent in performing chemical oxidation polymerization of polymerizable monomers such as thiophene or its derivative.

Also, among the ferric salts of aromatic sulfonic acids, there are following reports: Particularly useful is ferric toluenesulfonate or ferric methoxybenzene sulfonate. In order to synthesize a conductive polymer using them, they are used as a dopant and oxidant agent, and mixed with a polymerizable monomer such as thiophene or its derivatives. As a result, this technology is suitable to expand it as industrialization (Patent References Nos. 1-2).

However, when a conductive polymer is obtained by using ferric toluenesulfonate serving as an oxidant and dopant agent, it does not attain the characteristics that can fully satisfy the requirements of the initial resistance value and the heat resistance. Also, when a conductive polymer is obtained by using ferric methoxybenzene sulfonate as an oxidant dopant agent, it can attain satisfactory properties of lowered initial resistance value and improved heat resistance more than the conductive polymer obtained by using ferric toluenesulfonate; however, such characteristics cannot still reach complete satisfaction.

Also, when thereby obtained conductive polymer is used as a solid electrolyte of a solid electrolytic capacitor, the following issues may have to be considered. That is, a conductive polymer obtained by means of a chemical oxidation polymerization method is usually not soluble in a solvent. Therefore, it is necessary to form a layer of the conductive polymer directly provided on an element; here, the element includes: a positive electrode of a porous body made of a valve metal such as tantalum, niobium and aluminum; and a dielectric layer made of an oxide film of such valve metal.

However, the direct formation of the conductive polymer on the element requires working under very complicated conditions. Therefore, its reproducibility was poor, and process control was very hard.

Under the situations above, a soluble conductive polymer has been positively researched (See Patent Reference No. 3). Patent reference No. 3 reports that a conductive polymer dispersion liquid can be obtained from mixture polystyrene sulfonate, ammonium persulfate, an iron salt, and ethylenedioxy thiophene, and then, cause a reaction. However, the conductive polymer as produced is considered to require further improvements in its conductivity in order to use it as a solid electrolyte of a solid electrolytic capacitor.

Also, there is a report of a conductive polymer in which polyaniline is doped with phenolsulfonic acid novolac resin (See Patent Reference Nos. 4-5). However, thereby obtained conductive polymer is also not enough in the conductivity, and therefore, further improvements are necessary to use it as a solid electrolyte of a solid electrolytic capacitor.

Also, there is a report of a conductive polymer in which polyaniline is doped with solvent-soluble polyester sulfonic acid (See Patent Reference No. 6). However, the conductive polymer as obtained is still not enough in the conductivity, and therefore, further improvements are necessary to use it as solid electrolyte of a solid electrolytic capacitor.

Furthermore, there is a report of polyethylenedioxy thiophene. Here, using polystyrene sulfonate or sulfonated polyester or phenolsulfonic acid novolac resin as a dopant, thiophene or its derivative can be polymerized by electrolytic oxidation in water or in an aqueous solution of a mixture of water and water-miscible solvent (See Patent Reference No. 7). There is also another report of polyethylenedioxy thiophene. Here, using a combination of polystyrene sulfonate with at least one kind of sulfonated polyester and phenolsulfonic acid novolac resin to serve as a dopant, thiophene or its derivative can be polymerized by oxidation polymerization in water or in an aqueous solution (See Patent Reference No. 8).

These polyethylenedioxy thiophenes are reported to have high conductivity and superior heat resistance, and therefore, solid electrolytic capacitors using them as solid electrolyte become lower ESR (equivalent series resistance) with reliability in a hot condition. However, as improving electronic equipment, it has been further demanded to develop a solid electrolytic capacitor in which the ESR is further lowered, the heat resistance is further improved to make it more reliable in a hot condition while it is less likely to cause leak current.

PRIOR ART REFERENCES

Patent Reference

Patent Reference No. 1: Japanese Laid-Open Patent Publication No. 2003-160,647
Patent Reference No. 2: Japanese Laid-Open Patent Publication No. 2004-265,927
Patent Reference No. 3: Japanese Patent No. 2,636,968
Patent Reference No. 4: Japanese Patent No. 3,906,071
Patent Reference No. 5: Japanese Laid-Open Patent Publication No. 2007-277,569

Patent Reference No. 6: Japanese Laid-Open Patent Publication No. H08-41,321
Patent Reference No. 7: International Patent Publication No. 2009/131,011
Patent Reference No. 8: International Patent Publication No. 2009/131,012

SUMMARY OF THE INVENTION

The Objectives to Solve by the Invention

The present invention has been accomplished in view of the circumstances as explained above. Therefore, its purpose is to provide a conductive polymer which is high in the conductivity and superior in the heat resistance, and thus, is suitable to be used as solid electrolyte of a solid electrolytic capacitor. Using the conductive polymer as solid electrolyte, the purpose is also to provide a solid electrolytic capacitor in which its ESR is low (small) and its reliability in a hot condition is high, as well as leak current is less likely to occur.

Means to Solve the Problem

In order to solve the problems as described above, the inventors of the present application have accomplished the present invention. Here, there is provided a conductive polymer dispersion liquid obtained by a method in which in the presence of a copolymer from styrenesulfonic acid, and at least one kind of a non-sulfonic acid monomer selected from the group consisting of methacrylate, acrylate, and an unsaturated hydrocarbon containing alkoxysilane compound (i.e., an alkoxysilane compound containing an unsaturated hydrocarbon) or its hydrolysate, thiophene or its derivative is polymerized by oxidation polymerization in water, or in an aqueous solution comprising a mixture of water and a water miscible solvent.

Namely, according to the first aspect of the present invention, the conductive polymer dispersion liquid has the features below. In the presence of a copolymer from styrenesulfonic acid, and at least one kind of a non-sulfonic acid monomer selected from the group consisting of methacrylate, acrylate, and an unsaturated hydrocarbon containing alkoxysilane compound or its hydrolysate, thiophene or its derivative is polymerized by oxidation polymerization in water, or in an aqueous solution comprising a mixture of water and a water miscible solvent to produce the conductive polymer dispersion liquid.

Also, the second aspect of the invention is the conductive polymer dispersion liquid below. In the presence of follows (I) and (II), thiophene or its derivative is polymerized by oxidation polymerization in water, or in an aqueous solution comprising a mixture of water and a water miscible solvent to produce the conductive polymer dispersion liquid.
(I) A copolymer from styrenesulfonic acid, and at least one kind of a non-sulfonic acid monomer selected from the group consisting of methacrylate, acrylate, and an unsaturated hydrocarbon containing alkoxysilane compound or its hydrolysate.
(II): polystyrenesulfonic acid.

The third aspect of the present invention is the conductive polymer dispersion liquid below. There is provided a conductive polymer dispersion liquid comprising: a conductive polymer obtained by a method in which in the presence of component (I), thiophene or its derivative is polymerized by oxidation polymerization in water, or in an aqueous solution comprising a mixture of water and a water miscible solvent, and another conductive polymer obtained by a method in which in the presence of component (III), thiophene or its derivative is polymerized by oxidation polymerization in water, or in an aqueous solution comprising a mixture of water and a water miscible solvent.
(I) A copolymer from styrenesulfonic acid, and at least one kind of a non-sulfonic acid monomer selected from the group consisting of methacrylate, acrylate, and an unsaturated hydrocarbon containing alkoxysilane compound or its hydrolysate.
(III): At least one kind of polymer anion selected from the group consisting of sulfonated polyester and phenolsulfonic acid novolac resin.

The fourth aspect of the present invention is the conductive polymer dispersion liquid below. There is provided a conductive polymer dispersion liquid comprising: a conductive polymer obtained by a method in which in the presence of components (I) and (II), thiophene or its derivative is polymerized by oxidation polymerization in water, or in an aqueous solution comprising a mixture of water and a water miscible solvent; and another conductive polymer obtained by a method in which in the presence of component (III), thiophene or its derivative is polymerized by oxidation polymerization in water, or in an aqueous solution comprising a mixture of water and a water miscible solvent.
(I) A copolymer from styrenesulfonic acid, and at least one kind of a non-sulfonic acid monomer selected from the group consisting of methacrylate, acrylate, and an unsaturated hydrocarbon containing alkoxysilane compound or its hydrolysate.
(II): Polystyrenesulfonic acid.
(III): At least one kind of polymer anion selected from the group consisting of sulfonated polyester and phenolsulfonic acid novolac resin.

The fifth aspect of the present invention is the conductive polymer dispersion liquid below. There is provided a conductive polymer dispersion liquid obtained by a method in which in the presence of components (I) and (III), thiophene or its derivative is polymerized by oxidation polymerization in water, or in an aqueous solution comprising a mixture of water and a water miscible solvent to produce the conductive polymer dispersion liquid.
(I) A copolymer from styrenesulfonic acid, and at least one kind of a non-sulfonic acid monomer selected from the group consisting of methacrylate, acrylate, and an unsaturated hydrocarbon containing alkoxysilane compound or its hydrolysate.
(III): At least one kind of polymer anion selected from the group consisting of sulfonated polyester and phenolsulfonic acid novolac resin.

The sixth aspect of the present invention is the conductive polymer dispersion liquid below. There is provided a conductive polymer dispersion liquid obtained by a method in which in the presence of the following components (I) and (II) and (III), thiophene or its derivative is polymerized by oxidation polymerization in water, or in an aqueous solution comprising a mixture of water and a water miscible solvent.
(I) A copolymer from styrenesulfonic acid, and at least one kind of a non-sulfonic acid monomer selected from the group consisting of methacrylate, acrylate, and an unsaturated hydrocarbon containing alkoxysilane compound or its hydrolysate.
(II): Polystyrenesulfonic acid.
(III): At least one kind of polymer anion selected from the group consisting of sulfonated polyester and phenolsulfonic acid novolac resin.

Furthermore, the present invention provides the application use of a conductive polymer obtained by drying the conductive polymer dispersion liquid as described above; a solid electrolytic capacitor using the conductive polymer above as a solid electrolyte; and a conductive film made of the conductive polymer above.

Effect of the Invention

The conductive polymer of the first aspect of the invention has high conductivity and excellent heat resistance so that it is suitable to be used as a solid electrolyte of a solid electrolytic capacitor. Using it as the solid electrolyte of the solid electrolytic capacitor, there can be provided a solid electrolytic capacitor having low ESR with high reliability at a hot condition, while it is less likely to cause leak current. In addition, the conductive polymer above has high conductivity and excellent heat resistance as well as high transparency, and therefore, there can be provided a conductivity film having high conductivity, excellent heat resistance and high transparency.

The conductive polymer of the second aspect of the invention has the features of the conductive polymer of the first aspect of the invention. In addition, its conductivity can be further improved. Therefore, when it is used as a solid electrolyte of a solid electrolytic capacitor, further improvement in lowering the ESR of the solid electrolytic capacitor can be accomplished. Also, a conductive film can be provided, having further improvement in the conductivity.

Also, the conductive polymer of the third aspect of the invention has the features of the first aspect of the invention. In addition, further improvement in the adhesion properties can be accomplished, compared with the conductive polymer of the first aspect of the invention. Therefore, using it as a solid electrolyte of a solid electrolytic capacitor, further improvement in lowering the ESR of the solid electrolytic capacitor can be accomplished.

Also, the conductive polymer of the fourth aspect of the invention is provided with the features of the second aspect of the invention. In addition, further improvement in the adhesion properties can be accomplished compared with the conductive polymer of the second aspect of the invention. Therefore, using it as a solid electrolyte of a solid electrolytic capacitor, further improvement in lowering the ESR of the solid electrolytic capacitor can be accomplished.

Also, the fifth aspect of the invention can attain the same effects as the third aspect of the invention. The sixth aspect of the invention can attain the same effects as the fourth aspect of the invention.

EMBODIMENTS TO CARRY OUT THE INVENTION

The first aspect of the invention includes the basic concept of the present invention, as described below. In synthesis of the conductive polymer, the following dopant is used. That is, it is a copolymer from styrenesulfonic acid, and at least one kind of a non-sulfonic acid monomer selected from the group consisting of methacrylate, acrylate, and an unsaturated hydrocarbon containing alkoxysilane compound or its hydrolysate. Therefore, a conductive polymer can be provided with a high conductivity and an excellent heat resistance, and thus, is suitable to be used as a solid electrolyte of a solid electrolytic capacitor. Also, a conductive polymer can be provided which is suitable in producing a conductive film having a high conductivity and an excellent heat resistance. The reason why styrenesulfonic acid is used as an ingredient of the monomers in synthesizing the copolymer serving as dopant is because its sulfonic acid moiety can provide an anion. This anion is necessary to serve as a dopant, as well as to provide water-solubility of the copolymer.

Also, the counter monomer to copolymerize with the styrenesulfonic acid is at least one kind selected from the group consisting of methacrylate, acrylate and an unsaturated hydrocarbon containing alkoxysilane compound or its hydrolysate. Here, styrenesulfonic acid is literally a sulfonic acid system monomer. By contrast, the counter monomer above is a non-sulfonic acid system monomer. The reason why the sulfonic acid system monomer is copolymerized with the non-sulfonic acid monomer is because thereby obtained copolymer is superior to the homopolymer of styrenesulfonic acid (i.e., polystyrene sulfonic acid) when used as a dopant. That is, a conductive polymer can be provided which is superior in the adhesion properties with various substrates, having a high conductivity and an excellent heat resistance. Therefore, a solid electrolytic capacitor which has a low ESR and high reliable in a hot condition can be obtained. Also, a conductive film having a high conductivity and an excellent heat resistance can be obtained. The styrenesulfonic acid is used not in a monomer state, but in a polymerized state. This is because when a conductive polymer is polymerized by using a polymer dopant, it becomes good dispersibility or solubility to water or a solvent, and also, is provided with a property to restrict the de-dedoping.

The following features are found in the copolymer made from styrenesulfonic acid, and at least one kind of a non-sulfonic acid monomer selected from the group consisting of methacrylate, acrylate, and an unsaturated hydrocarbon containing alkoxysilane compound or its hydrolysate. A mass ratio of 1:0.01 to 0.1:1 is preferable for the styrenesulfonic acid to said at least one kind of the non-sulfonic acid monomer selected from the group consisting of methacrylate, acrylate, and an unsaturated hydrocarbon containing alkoxysilane compound or its hydrolysate. In other words, as the ratio of the styrenesulfonic acid becomes less than the above range, the conductivity of the conductive polymer can be decreased, thereby increasing the ESR of the condenser. On the contrary, when the ratio of the styrenesulfonic acid becomes more than the above range, the heat resistance and the adhesion properties of the conductive polymer are decreased and the ESR of the condenser can be increased, and thereby deteriorating the heat resistance.

Also, the following feature is found in the copolymer made from styrenesulfonic acid, and at least one kind of a non-sulfonic acid monomer selected from the group consisting of methacrylate, acrylate, and an unsaturated hydrocarbon containing alkoxysilane compound or its hydrolysate. That is, it is preferable that the copolymer has a weight average molecular weight of around 5,000 to 500,000, in view of the water-solubility and dopant properties. It is further preferable that the weight average molecular weight is around 40,000 to 200,000. Namely, when the weight average molecular weight of the copolymer is smaller than the above range, the function as a dopant can be deteriorated, and therefore, it may be difficult to obtain a conductive polymer having a high conductivity and an excellent heat resistance. On the other hand, when the weight average molecular weight becomes larger than the range above, the water-solubility can be decreased, and therefore, the handling characteristics might be deteriorated.

As the methacrylate mentioned above, the followings can be exemplified. The examples thereof can include methyl methacrylate, ethyl methacrylate, propyl methacrylate, butyl methacrylate, hexyl methacrylate, stearyl methacrylate, cyclohexyl methacrylate, diphenylbutyl methacrylate, dimethylaminoethyl methacrylate, diethylaminoethyl methacrylate, sodium sulfohexyl methacrylate, glycidyl methacrylate, methylglycidyl methacrylate, hydroxyalkyl methacrylate (i.e., hydroxyalkyl methacrylate such as hydroxymethyl methacrylate, hydroxyethyl methacrylate, hydroxypropyl methacrylate, hydroxybutyl methacrylate, hydroxyhexyl methacrylate, and hydroxystearyl methacrylate), hydroxypolyoxyethylene methacrylate, methoxyhydroxypropyl methacrylate, ethoxyhydroxypropyl methacrylate, dihydroxypropyl methacrylate, and dihydroxybutyl methacrylate. In particular, preferable are hydroxymethyl methacrylate, hydroxyethyl methacrylate, hydroxypropyl methacrylate, and hydroxybutyl methacrylate. The alkyl group of these hydroxyalkyl methacrylates has a carbon number of 1 to 4. It is preferable to exhibit characteristics serving as a dopant when it is copolymerized with styrenesulfonic acid. Also, the compounds such as glycidyl methacrylate and methylglycidyl methacrylate include glycidyl group. These compounds have a structure having hydroxyl group when opening the glycidyl group. Therefore, in the same reasons as the hydroxyalkyl methacrylate, a compound having a glycidyl group is also preferable in view of the characteristic serving as a dopant when it is copolymerised with styrenesulfonic acid.

As the acrylate mentioned above, the followings can be exemplified. The example thereof can include methyl acrylate, ethyl acrylate, propyl acrylate, butyl acrylate, hexyl acrylate, stearyl acrylate, cyclohexyl acrylate, diphenylbutyl acrylate, dimethylaminoethyl acrylate, diethylaminoethyl acrylate, sodium sulfohexyl acrylate, glycidyl acrylate, methylglycidyl acrylate, hydroxyalkyl acrylate, (i.e., hydroxyalkyl acrylate such as hydroxymethyl acrylate, hydroxyethyl acrylate, hydroxypropyl acrylate, and hydroxybutyl acrylate) can be used. In particular, preferable are hydroxymethyl acrylate, hydroxyethyl acrylate, hydroxypropyl acrylate and hydroxybutyl acrylate. The carbon number of these compounds has a carbon number of 1 to 4. It is preferable to exhibit a characteristic serving as a dopant when it is copolymerized with styrenesulfonic acid. Also, the compounds such as glycidyl acrylate and methylglycidyl acrylate include glycidyl group. These compounds have a structure having hydroxyl group when opening the glycidyl group. Therefore, in the same reasons as the hydroxyalkyl acrylate, a compound having a glycidyl group is also preferable in view of the characteristic serving as a dopant when it is copolymerised with styrenesulfonic acid.

As the unsaturated hydrocarbon containing alkoxysilane compound or its hydrolysate as mentioned above, the followings can be exemplified. The examples thereof can include an unsaturated hydrocarbon containing alkoxysilane compound and its hydrolysate such as 3-methacryloxypropyltrimethoxysilane, 3-methacryloxypropylmethyldimethoxysilane, 3-methacryloxypropyldimethylmethoxysilane, 3-methacryloxypropyldimethylethoxysilane, 3-methacryloxypropyltriethoxysilane, 3-acryloxypropyltrimethoxysilane, 3-acryloxymethyldimethoxysilane, 3-acryloxymethyldiethoxysilane, 3-acryloxytriethoxysilane, p-styryltrimethoxysilane, p-styryltriethoxysilane, p-styrylmethyldimethoxysilane, vinyltrimethoxysilane, vinyltriethoxysilane, vinylmethyldimethoxysilane, and vinyldimethylmethoxysilane. The hydrolysate of such an unsaturated hydrocarbon containing alkoxysilane compound can be as follows. For example, if the unsaturated hydrocarbon containing alkoxysilane compound is 3-methacryloxypropyltrimethoxysilane, it can be a compound having a structure in which its methoxy group is hydrolyzed to become hydroxyl group (i.e., 3-methacryloxytrihydroxysilane), or a compound having a structure in which silane groups are condensed each other to form an oligomer while its methoxy group that has not been involved in the reaction becomes hydroxyl group.

Also, as the unsaturated hydrocarbon containing alkoxysilane compound, favorable are 3-methacryloxypropyltrimethoxysilane, 3-acryloxypropyltrimethoxysilane, p-styryltrimethoxysilane, vinyltrimethoxysilane in view of serving as a dopant when copolymerized with styrenesulfonic acid.

In synthesizing a conductive polymer, when the copolymer serving as a dopant is a copolymer of styrenesulfonic acid and the unsaturated hydrocarbon containing alkoxysilane compound, the following change can be considered. That is, when it is actually used as a dopant for conductive polymer synthesis, a solvent of water system is used in the synthetic process of the conductive polymer. Here, the alkoxy group of the alkoxysilane compound in the copolymer is hydrolyzed, thereby a structure having hydroxyl group can be obtained.

As a dopant in the synthesis of the conductive polymer, useful can be the following amount of the copolymer made from styrenesulfonic acid, and at least one kind of a non-sulfonic acid monomer selected from the group consisting of methacrylate, acrylate, and an unsaturated hydrocarbon containing alkoxysilane compound or its hydrolysate. That is, with respect to thiophene or its derivative, its mass ratio can be preferably 1:0.01 to 1:20, and in particular, 1:0.1 to 1:2. Namely, with respect to the copolymer made from styrenesulfonic acid, and at least one kind of a non-sulfonic acid monomer selected from the group consisting of methacrylate, acrylate, and an unsaturated hydrocarbon containing alkoxysilane compound or its hydrolysate, if it is used at an amount less than the range above, the function to serve as a dopant for the copolymer might not be able to exhibit enough. Also, if the amount of the copolymer is used more than the range above, the effect by such increase can be hardly seen, but rather, the conductivity of the conductive polymer as produced might be deteriorated.

In the second aspect of the present invention, the dopant used is as follows. That is, it is a combination of component (I) (i.e., the copolymer made from styrenesulfonic acid, and at least one kind of a non-sulfonic acid monomer selected from the group consisting of methacrylate, acrylate, and an unsaturated hydrocarbon containing alkoxysilane compound or its hydrolysate), and component (II) (i.e., polystyrene sulfonic acid). Here, this polystyrene sulfonic acid has preferably a weight average molecular weight of 10,000 to 1,000,000.

Namely, when the weight average molecular weight of the polystyrene sulfonic acid above is smaller than 10,000, thereby obtained conductive polymer might have a low conductivity. By contrast, when the weight average molecular weight of the polystyrene sulfonic acid above is larger than 1,000,000, the dispersion liquid of the conductive polymer might have a high viscosity. Therefore, upon the preparation of the solid electrolytic capacitor, it might become hard to be used. In addition, among the range above, the weight average molecular weight of the polystyrene sulfonic acid can be preferably 20,000 or more, and in particular, 40,000 or more. Also, it can be preferably 800,000 or less, and in particular, 300,000 or less.

As described above, the dopant can be a combination as follows. That is, it is a combination of a copolymer made from styrenesulfonic acid, and at least one kind of a non-sulfonic acid monomer selected from the group consisting of methacrylate, acrylate, and an unsaturated hydrocarbon containing alkoxysilane compound or its hydrolysate, with polystyrene sulfonic acid. Thereby, in addition to the property from the copolymer alone, further improvement of the conductivity of the conductive polymer can be accomplished. In the combination, the mass ratio of the copolymer to the polystyrene sulfonic acid can be preferably 1:0.01 to 0.1:1.

Also, when using the combination of the copolymer made from styrenesulfonic acid, and at least one kind of a non-sulfonic acid monomer selected from the group consisting of methacrylate, acrylate, and an unsaturated hydrocarbon containing alkoxysilane compound or its hydrolysate, together with polystyrene sulfonic acid, the amount to be used in total can be a mass ratio of preferably 1:0.01 to 1:20, and in particular, 1:0.1 to 1:2, with respect to that of thiophene or its derivative.

In the present invention, thiophene or its derivative is the polymerizable monomer to be used in synthesizing the conductive polymer by oxidation polymerization. Here, the derivative of thiophene can be as follows. That is, the example of the derivative can include 3,4-ethylenedioxy thiophene, 3-alkylthiophene, 3-alkoxythiophene, 3-alkyl-4-alkoxythiophene, 3,4-alkylthiophene, 3,4-alkoxythiophene, and alkylated ethylenedioxy thiophene in which 3,4-ethylenedioxy thiophene is modified with an alkyl group. The carbon number of the alkyl group and the alkoxy group can be preferably 1 to 16, and in particular, 1 to 4.

Further explanation is made for the alkylated ethylenedioxy thiophene in which 3,4-ethylenedioxy thiophene is modified with an alkyl group. 3,4-ethylenedioxy thiophene and the alkylated ethylenedioxy thiophene mentioned above correspond to a compound represented by the following formula (1).

Formula 1

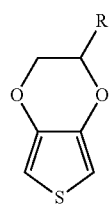

(1)

In the formula, R is hydrogen or an alkyl group.

In the formula (1) mentioned above, when R is hydrogen, it is 3,4-ethylenedioxythiophene. When it is expressed by the IUPAC name, it is 2,3-dihydro-thieno [3,4-b][1,4] dioxine. However, this compound is often expressed by its common name, "3,4-ethylenedioxythiophene," rather than the IUPAC name. Therefore, this specification refers it as "3,4-ethylenedioxythiophene" rather than "2,3-dihydro-thieno [3,4-b][1,4] dioxine." Also, when R in the formula (1) is an alkyl group, this alkyl group can have a carbon number of 1 to 4. In other words, it can be preferably methyl group, ethyl group, propyl group, or butyl group. The examples of these compounds are as follows. When R in formula (1) is methyl group, such a compound is "2-methyl-2,3-dihydro-thieno [3,4-b][1,4] dioxine)" under the IUPAC name. Hereinafter, this compound is simply referred to as "methylated ethylenedioxythiophene." When R in formula (1) is ethyl group, such a compound is 2-ethyl-2,3-dihydro-thieno [3,4-b][1,4] dioxine)" under the IUPAC name. Hereinafter, this compound is simply referred to as "ethylated ethylenedioxythiophene." When R in formula (1) is propyl group, such a compound is 2-propyl-2,3-dihydro-thieno [3,4-b][1,4] dioxine under the IUPAC name. Hereinafter, this compound is simply referred to as "propylated ethylenedioxythiophene." Also, when R in formula (1) is butyl group, such a compound is 2-butyl-2,3-dihydro-thieno [3,4-b][1,4] dioxine under the IUPAC name. Hereinafter, this compound is simply referred to as "butylated ethylenedioxythiophene." In addition, "2-alkyl-2,3-dihydro-thieno [3,4-b][1, 4] dioxine" is simply referred to as "alkylated ethylenedioxythiophene." Here, among these alkylated ethylenedioxy thiophenes, preferable are methylated ethylenedioxythiophene, ethylated ethylenedioxythiophene, propylated ethylenedioxythiophene, and butylated ethylenedioxythiophene.

Using the copolymer made from styrenesulfonic acid, and at least one kind of a non-sulfonic acid monomer selected from the group consisting of methacrylate, acrylate, and an unsaturated hydrocarbon containing alkoxysilane compound or its hydrolysate, thiophene or its derivative is polymerized by means of oxidation polymerization. Also, using the combination of the copolymer and polystyrene sulfonic acid, thiophene or its derivative is polymerized by means of oxidation polymerization. Here, the polymerization is conducted in water or an aqueous solution including water and a water-miscible solvent.

As the water-miscible solvent constituting the aqueous solution mentioned above, the example can include methanol, ethanol, propanol, acetone, and acetonitrile. The mixing ratio of the water-miscible solvent with respect to water can be preferably 50% by mass or less.

The oxidation polymerization for preparing the conductive polymer can be either chemical oxidation polymerization or electrolytic oxidation polymerization.

As an oxidant to carry out the chemical oxidation polymerization, persulfates can be used. The example of the persulfates can include ammonium persulfate, sodium persulfate, potassium persulfate, calcium persulfate, and barium persulfate.

Regarding the chemical oxidation polymerization, the condition during the polymerization is not particularly limited. The temperature in the chemical oxidation polymerization can be preferably 5° C. to 95° C., and in more particular, it can be 10° C. to 30° C. The polymerization period can be preferably one hour to 72 hours, and in more particular, it can be eight hours to 24 hours.

The electrolytic oxidation polymerization can be carried out either in constant current or constant voltage. For example, when the electrolytic oxidation polymerization is performed in constant current, its current value can be preferably 0.05 mA/cm$^2$ to 10 mA/cm$^2$, and in particular, it can be 0.2 mA/cm$^2$ to 4 mA/cm$^2$. When the electrolytic oxidation polymerization is performed in constant voltage, its voltage can be preferably 0.5V to 10V, and in more particular, it can be 1.5V to 5V. The temperature in the electrolytic oxidation polymerization can be preferably 5° C. to 95° C., and in more particular, it can be 10° C. to 30° C. The polymerization period can be preferably one hour to 72 hours, and in more particular, it can be eight hours to 24 hours. In addition, upon the electrolytic oxidation polymerization, ferrous sulfate or ferric sulfate can be added as a catalyst.

Just after the polymerization as prepared above, the conductive polymer can be in a dispersion state in water or the aqueous solution, and includes persulfate used as an oxidant, or an iron sulfate or its decomposition product used a catalyst. Therefore, the dispersion liquid of the conductive polymer including the impurities is applied to a dispersion machine such as an ultrasonic homogenizer, high-pressure homogenizer or planetary ball mill to disperse the impurities. Then, the metal components are favorably removed with a cation exchange resin. When the particle size of the conductive polymer at this stage is measured by means of dynamic light scattering method, it can be preferably 100 μm or less, and in particular, 10 μm or less. Also, it can be preferably 10 nm or more, and in particular, 100 nm or more. Then, a process such as ethanol precipitation process, ultra-filtration process and anion exchange resin process is applied to remove the compounds generated by decomposition of the oxidant and the catalyst. As explained later, a conductive improver and a binder can be added, if necessary.

Also, the third aspect of the present invention has the features as explained before. That is, the component (I) is the copolymer made from styrenesulfonic acid, and at least one kind of a non-sulfonic acid monomer selected from the group consisting of methacrylate, acrylate, and an unsaturated hydrocarbon containing alkoxysilane compound or its hydrolysate). The component (I) is used as a dopant to prepare a conductive polymer dispersion liquid including a conductive polymer. In addition, the component (III) is at least one kind of polymer anion selected from the group consisting of sulfonated polyesters and phenolsulfonic acid novolac resin. In the presence of the component (III), thiophene or its derivative is polymerized by means of oxidation polymerization in water or in an aqueous solution of a mixture of water and a water-miscible solvent. Thereby, another conductive polymer dispersion liquid is prepared. These conductive polymer dispersion liquids are mixed. In this invention, a conductive polymer and a solid electrolytic capacitor can be obtained which have both the properties resulting from the use of the copolymer as a dopant, as well as the properties resulting from the use of the polymer anion as a dopant.

Also, the fourth aspect of the present invention has the features as explained before. That is, the component (I) is the copolymer made from styrenesulfonic acid, and at least one kind of a non-sulfonic acid monomer selected from the group consisting of methacrylate, acrylate, and an unsaturated hydrocarbon containing alkoxysilane compound or its hydrolysate). The compound (II) is polystyrene sulfonic acid. Using both compounds (I) and (II), a conductive polymer dispersion liquid is prepared. In addition, the component (III) is at least one kind of polymer anion selected from the group consisting of sulfonated polyesters and phenolsulfonic acid novolac resin. In the presence of the component (III), thiophene or its derivative is polymerized by means of oxidation polymerization in water or in an aqueous solution of a mixture of water and a water-miscible solvent, to prepare another conductive polymer dispersion liquid. By mixing these conductive polymer dispersion liquids, the invention can produce a conductive polymer and a solid electrolytic capacitor which have both the properties resulting from the use of the copolymer and the polystyrene sulfonic acid as a dopant, as well as the properties resulting from the use of the polymer anion as a dopant. In the fifth aspect of the invention and the sixth aspect of the invention, the invention can produce a conductive polymer and a solid electrolytic capacitor which have properties resulting from each dopant.

The sulfonated polyester above can be obtained by condensation polymerization from dicarboxy benzenesulfonic acid diester such as sulfoisophthalate and sulfoterephthalate, and alkylene glycol in the presence of a catalyst such as antimony oxide or zinc oxide. The weight average molecular weight of the sulfonated polyesters can be preferably 5,000 to 300,000.

Namely, when the weight average molecular weight of sulfonated polyester is lower than 5,000, the conductive polymer as obtained might have a low conductivity. When the weight average molecular weight of the sulfonated polyester is larger than 300,000, the dispersion liquid of the conductive polymer might have a high viscosity, and therefore, it might become hard to handle in the preparation of a solid electrolytic capacitor. In addition, within the range mentioned above, the weight average molecular weight of the sulfonated polyester can be preferably 10,000 or more, and in particular, 20,000 or more. Also, it can be preferably 100,000 or less, and in particular, 80,000 or less.

Also, the phenolsulfonic acid novolac resin mentioned above can be exemplified by the following formula (2).

Formula 2

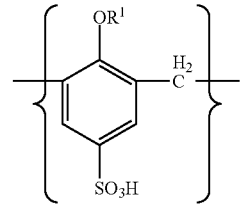

(2)

In the formula above, R1 is hydrogen or a methyl group. Preferably, one with a repeat unit as shown above can be used. The phenolsulfonic acid novolac resin can be provided with a weight average molecular weight of 5,000 to 500,000.

Namely, when the weight average molecular weight of the phenolsulfonic acid novolac resin above is smaller than 5,000, thereby obtained conductive polymer might be low in the conductivity. By contrast, when the weight average molecular weight of the phenolsulfonic acid novolac resin above is larger than 500,000, the viscosity of the dispersion liquid of the conductive polymer becomes high, and therefore, it might be difficult to handle it in the production of a solid electrolytic capacitor. In addition, within the range mentioned above, the weight average molecular weight of the phenolsulfonic acid novolac resin can be preferably 10,000 or more. Also, it can be preferably 400,000 or less, and in particular, 80,000 or less.

Also, using the polymer anion of at least one kind selected from the group consisting of sulfonated polyester and phenolsulfonic acid novolac resin, thiophene or its derivative is polymerized by means of oxidation polymerization. This oxidation polymerization can be carried out in a similar way to that using the copolymer made from styrenesulfonic acid, and at least one kind of a non-sulfonic acid monomer selected from the group consisting of methacrylate, acrylate, and an unsaturated hydrocarbon containing alkoxysilane compound or its hydrolysate, serving as a dopant. Therefore, it can be performed in water or an aqueous solution of a mixture of water and a water-miscible solvent. Similarly, either of chemical oxidation polymerization or electrolytic oxidation polymerization can be adopted. The conditions of the polymerization can be adopted in the same manner as those for the oxidation polymerization of thiophene or its derivative in the presence of the copolymer as a dopant.

The conductive polymer dispersion liquid of the present invention can include a high boiling point organic solvent having a boiling point of 150° C. or more, or a saccharide for the purpose of a conductive improver. In this way, when such a conductive improver is included in the conductive polymer dispersion liquid, the conductivity of a conductive polymer film made by drying the conductive polymer dispersion liquid can be improved. As a result, when preparing a solid electrolytic capacitor by using the conductive polymer as a solid electrolyte, its ESR can be lowered.

The improvements above are considered to be accomplished by the following reasons. To produce a solid electrolytic capacitor, a capacitor element is immersed in a conductive polymer dispersion liquid, and it is taken out and dried. At this time, the layer density in the thickness direction of the conductive polymer can be increased. As a result, a space between the conductive polymers becomes small. Therefore, a conductivity of the conductive polymer can be increased. Then, when this conductive polymer is used as a solid electrolyte of a solid electrolytic capacitor, it is considered that the ESR of the solid electrolytic capacitor can be lowered.

Also, when the conductive improver is included in the conductive polymer dispersion liquid of the present invention, the conductivity of the conductive polymer film made by drying the conductive polymer dispersion liquid can be improved. Therefore, the conductivity of the conductive film made from the conductive polymer above can be further improved.

The conductive improver above can be a high boiling point organic solvent having a boiling point of 150° C. or more, or a saccharide. The example of the high boiling point organic solvent having a boiling point of 150° C. or more can include dimethylsulfoxide, butanediol, γ-butyrolactone, sulfolane, N-methylpyrrolidone, dimethylsulfone, ethylene glycol, diethylene glycol, and polyethylene glycol. Also, the examples of the saccharide include erythritol, glucose, mannose, and pullulan. As the conductive improver, dimethylsulfoxide and butanediol are particularly preferable. Here, as to the organic solvent having a boiling point of 150° C. or more, its boiling point is under the ordinary pressure (that is, 1 atm=1013.25 hPa).

The conductive improver can be added at an amount below. It is preferable to add 5 to 3,000% by mass standard with respect to the conductive polymer in the dispersion liquid (namely, the conductive improver is added at 5 to 3,000 parts by mass with respect to 100 parts by mass of the conductive polymer). In particular, it can be added at 20 to 700%. When the conductive improver is added at an amount less than the range above, the effects to improve the conductivity might not be exhibited enough. By contrast, when the conductive improver is added at an amount more than the range above, it might take additional time for drying of the dispersion liquid, as well as it might cause deterioration to reduce the conductive.

In addition, since the content of the conductive polymer in the dispersion liquid affects the handling properties in immersing the capacitor element therein and taking it out therefrom. Thus, it is usually preferable to adjust it at the level of 0.5 to 15 mass %. In other words, when the content of the conductive polymer is less than the range above, it might take additional time for drying. By contrast, when the content of the conductive polymer is more than the range above, the viscosity of the dispersion liquid is increased, and thereby, the handling properties in producing a solid electrolytic capacitor might be deteriorated.

The conductive polymer dispersion liquid of the present invention is particularly suitable in using it in the preparation of the solid electrolytic capacitor. This is due to high conductivity and excellent heat resistance of the conductive polymer obtained by drying the conductive polymer dispersion liquid of the present invention. Therefore, when it is used as a solid electrolyte, a solid electrolytic capacitor can be prepared which has low ESR and is reliable in using it under a hot condition.

When using the conductive polymer dispersion liquid of the present invention to prepare a solid electrolytic capacitor, the dried form of the conductive polymer can be used as a solid electrolyte of the solid electrolytic capacitor. However, it can be also used in a state of dispersion liquid. In this case, a capacitor element is immersed in the conductive polymer dispersion liquid, and then, it is taken out for drying, and thereby dried conductive polymer can be used as a solid electrolyte.

Also in the production, for the purpose to increase the adhesion properties between the conductive polymer and the capacitor element, a binder can be added in the conductive polymer dispersion liquid. The example of such a binder can include polyvinyl alcohol, polyurethane, polyester, acrylic resin, polyamide, polyimide, epoxy resin, polyacrylonitrile resin, polymethacrylonitrile resin, polystyrene resin, novolac resin, sulfonated polyester, sulfonated polyallyl, sulfonated polyvinyl, sulfonated polystyrene, and a silane coupling agent. In particular, preferable are polyester, polyurethane, acrylic resin, sulfonated polyester, sulfonated polyallyl, sulfonated polyvinyl, and sulfonated polystyrene. In particular, when it has sulfone group in such a compound as sulfonated polyester, sulfonated polyallyl, sulfonated polyvinyl, and sulfonated polystyrene, the conductivity of the conductive polymer can be improved more favorably.

Next, the conductive polymer dispersion liquid of the present invention is described based on the examples to use it in the preparation of a solid electrolytic capacitor.

First, the explanation is made for the example when using the conductive polymer of the present invention in the preparation of tantalum solid electrolytic capacitor, niobium solid electrolytic capacitor, or laminated-type aluminum solid electrolytic capacitor. For example, there is provided a capacitor element having a positive electrode made of the porous body of a valve metal such as tantalum, niobium, and aluminum; and a dielectric layer made of an oxide layer of the valve metal. The capacitor element is immersed in the conductive polymer dispersion liquid of the present invention, and then, it is taken out and dried to form a layer of a solid electrolyte made of the conductive polymer. Also, if necessary, the steps of the immersing and the drying of the dispersion liquid can be repeated. As a result, a solid electrolyte layer made of the conductive polymer can be formed. Then, carbon paste and silver paste can be applied and dried, and then, an exterior package can be provided. Thereby, there can be producing tantalum solid electrolytic capacitor, niobium solid electrolytic capacitor, and laminated-type aluminum solid electrolytic capacitor.

Also, using an organic sulfonate of non-iron salt base as a dopant, the capacitor element above can be immersed in a liquid including a polymerizable monomer and an oxidant, and then, taken out for drying to polymerize. Then, it is immersed in water for washing, and then, taken out for drying. The process described above is, so-called, "on-site polymerization," to prepare a conductive polymer. Then, the step in which the capacitor element is immersed in the conductive polymer dispersion liquid of the present invention and then it is taken out for drying. The step can be repeated to form a solid electrolyte layer made of the conductive polymer of the present invention. It is also noted that the solid electrolyte layer can be prepared in a visa versa method (i.e., the capacitor element is first immersed in the conductive polymer dispersion liquid of the present invention and then it is taken out for drying; and second, the on-site polymerization is performed thereon.)

Then, thereby obtained capacitor element covered with the conductive polymer is then coated with carbon paste and silver paste. Then, an exterior package is provided. Thereby, there can be obtaining tantalum solid electrolytic capacitor, niobium solid electrolytic capacitor, and laminated-type aluminum solid electrolytic capacitor.

In addition, when the conductive polymer dispersion liquid of the present invention is used in the preparation of a winding-type aluminum solid electrolytic capacitor, the following process can be performed. For example, a surface of an aluminum foil is etched. Then, a conversion treatment is performed to form a dielectric layer, and a lead terminal is attached to its positive electrode. Also, a lead terminal is attached to a negative electrode made of an aluminum foil. These positive and negative electrodes, each having a lead terminal, are wound with an intervention of a separator to provide a capacitor element. The capacitor element is immersed in the conductive polymer dispersion liquid of the present invention, and then, taken out for drying to prepare a solid electrolyte layer made of the conductive polymer. Alternatively, the steps of immersing in and drying of the dispersion liquid can be repeated, if necessary. After forming the solid electrolyte layer made of the conductive polymer, exterior material is applied to provide an exterior package to obtain a winding type aluminum solid electrolytic capacitor.

As described above, the conductive polymer obtained by drying the conductive polymer dispersion liquid of the present invention (which may be hereinafter simply referred to as "conductive polymer of the present invention") can be featured as follows. That is, it has high conductivity and excellent heat resistance which can be suitably used as a solid electrolyte of a solid electrolytic capacitor. In addition, it has a high transparency, as well. Therefore, in addition to the use as such a solid electrolyte of solid electrolytic capacitors, it can be used in the preparation of a conductive film (antistatic film). Also, it can be used as a conductive body of antistatic material such as antistatic cloth and antistatic resin. Also in addition to the use above, using the characteristics above, the conductive polymer of the present invention can be used as positive electrode active material of batteries, and base resin of corrosion-resistant paints.

For example, when manufacturing a conductive film (antistatic film) using the conductive polymer of the present invention, the following process can be adopted. That is, the conductive polymer dispersion liquid can be applied to a basic sheet. Alternatively, a basic sheet is immersed in the conductive polymer dispersion liquid, and then, it is taken out and dried to form a conductive film, which can be then removed from the basic sheet. However, rather than that the conductivity film formed on at least one surface of the basic sheet is removed from the basic sheet, there may be sometimes an occasion where the basic sheet can be suitably used as a support of the conductive sheet (antistatic seat). Also, when the conductive polymer of the present invention is used as a conductive material to manufacture antistatic cloth, the following process can be adopted. That is, the conductive polymer dispersion liquid is applied on a cloth, or alternatively, it may be immersed in the conductive polymer dispersion liquid, and taken it out for drying. When, manufacturing such a conductive sheet or antistatic cloth, a binder can be added in the conductive polymer dispersion liquid in the same manner as described before. In this case, the adhesion properties of the conductive polymer with the basic sheet or the cloth can be improved.

EXAMPLES

Next, the present invention is explained more in detail with reference to the Examples. The construction of the present invention, however, should not be limited to the Examples alone. It is noted that in the Examples, the indication of "%" for the concentration or content is mass % unless otherwise noted.

Prior to the explanation of the Examples, Production Examples 1 to 13 are explained. Each of Production Examples 1 to 13 produced a copolymer from styrenesulfonic acid, and at least one kind of a non-sulfonic acid monomer selected from the group consisting of methacrylate, acrylate, and an unsaturated hydrocarbon containing alkoxysilane compound or its hydrolysate. The copolymer above was used as a dopant in the Examples.

Production Example 1

Production of Copolymer (Styrenesulfonic Acid:Hydroxyethyl Methacrylate=9:1)

Production Example 1 produced a copolymer of monomers consisting of styrenesulfonic acid and hydroxyethyl methacrylate (i.e., methacrylate) at a mass ratio of 9:1 at the time of the beginning of the use, as explained below. In the subsequent Production Examples of Production Example 1, the mass ratio of the monomers in the indication of the composition of the copolymer is at the time of the beginning of the use.

1 L of pure water was added in a separable flask with a stirrer with a volume of 2 L, into which 201.5 g of sodium styrenesulfonate (including 180 g of the styrenesulfonic acid content) and 20 g of hydroxyethyl methacrylate were added. Then, 1 g of ammonium persulfate as an oxidant was added into the solution. There, polymerization reaction of styrenesulfonic acid and hydroxyl methacrylate was conducted for 12 hours.

Then, into the reaction liquid, 100 g of cation exchange resin [AMBERLITE 120B (a commercial name)] manufactured by Organo Corporation was added, and stirred with a stirrer for one hour. Then, it was filtered with filter paper No. 131 manufactured by Toyo Roshi Kaisha, Ltd. The treatment by the cation exchange resin and the filtration was repeated three times to remove all the cationic components in the liquid.

With respect to the copolymer of styrenesulfonic acid and hydroxyethyl methacrylate as obtained above, GPC column (i.e., Gel Permeation Chromatography, which may hereinafter called as "GPC"), included in HPLC system (i.e., High performance liquid chromatography, which may hereinafter called as "HPLC"), was used for analysis. The results showed that the copolymer above was estimated to have a weight average molecular weight of 100,000 with a dextran standard.

Production Example 2

Production of Copolymer (Styrenesulfonic Acid:Hydroxyethyl Methacrylate=8:2)

Production Example 2 produced a copolymer of monomers consisting of styrenesulfonic acid and hydroxyethyl methacrylate at a mass ratio of 8:2, as explained below.

1 L of pure water was added in a separable flask with a stirrer with a volume of 2 L, into which 173.5 g of sodium styrenesulfonate (including 155 g of the styrenesulfonic acid content) and 33 g of hydroxyethyl methacrylate were added. Then, 1 g of ammonium persulfate was added into the solution to conduct a polymerization reaction of styrenesulfonic acid and hydroxyl methacrylate for 12 hours.

Then, into the reaction liquid, 100 g of cation exchange resin [AMBERLITE 120B (a commercial name)] manufactured by Organo Corporation was added, and stirred with a stirrer for one hour. Then, it was filtered with filter paper No. 131 manufactured by Toyo Roshi Kaisha, Ltd. The treatment by the cation exchange resin and the filtration was repeated three times to remove all the cationic components in the liquid.

With respect to the copolymer of styrenesulfonic acid and hydroxyethyl methacrylate as obtained above, an analyst was made with the HPLC system using the GPC column. The results showed that the copolymer above was estimated to have a weight average molecular weight of 90,000 with a dextran standard.

Production Example 3

Production of Copolymer (Styrenesulfonic Acid:Hydroxyethyl Methacrylate=4:6)

Production Example 3 produced a copolymer of monomers consisting of styrenesulfonic acid and hydroxyethyl methacrylate at a mass ratio of 4:6, as explained below.

1 L of pure water was added in a separable flask with a stirrer with a volume of 2 L, into which 89.6 g of sodium styrenesulfonate (including 80 g of the styrenesulfonic acid content) and 120 g of hydroxyethyl methacrylate were added. Then, 1 g of ammonium persulfate was added into the solution to conduct a polymerization reaction of styrenesulfonic acid and hydroxyl methacrylate for 12 hours.

Then, into the reaction liquid, 100 g of cation exchange resin [AMBERLITE 120B (a commercial name)] manufactured by Organo Corporation was added, and stirred with a stirrer for one hour. Then, it was filtered with filter paper No. 131 manufactured by Toyo Roshi Kaisha, Ltd. The treatment by the cation exchange resin and the filtration was repeated three times to remove all the cationic components in the liquid.

With respect to the copolymer of styrenesulfonic acid and hydroxyethyl methacrylate as obtained above, an analysis was made with the HPLC system using the GPC column. The results showed that the copolymer above was estimated to have a weight average molecular weight of 90,000 with a dextran standard.

Production Example 4

Production of Copolymer (Styrenesulfonic Acid:Glycidyl Methacrylate=9:1)

Production Example 4 produced a copolymer of monomers consisting of styrenesulfonic acid and glycidyl methacrylate at a mass ratio of 9:1, as explained below.

1 L of pure water was added in a separable flask with a stirrer with a volume of 2 L, into which 201.5 g of sodium styrenesulfonate (including 180 g of the styrenesulfonic acid content) and 20 g of glycidyl methacrylate were added. Then, 1 g of ammonium persulfate was added into the solution to conduct a polymerization reaction of styrenesulfonic acid and glycidyl methacrylate for 12 hours.

Then, into the reaction liquid, 100 g of cation exchange resin [AMBERLITE 120B (a commercial name)] manufactured by Organo Corporation was added, and stirred with a stirrer for one hour. Then, it was filtered with filter paper No. 131 manufactured by Toyo Roshi Kaisha, Ltd. The treatment by the cation exchange resin and the filtration was repeated three times to remove all the cationic components in the liquid.

With respect to the copolymer of styrenesulfonic acid and glycidyl methacrylate as obtained above, an analysis was made with the HPLC system using the GPC column. The results showed that the copolymer above was estimated to have a weight average molecular weight of 80,000 with a dextran standard.

Production Example 5

Production of Copolymer (Styrenesulfonic Acid:Hydroxyethyl Acrylate=9:1)

Production Example 5 produced a copolymer of monomers consisting of styrenesulfonic acid and hydroxyethyl acrylate at a mass ratio of 9:1, as explained below.

1 L of pure water was added in a separable flask with a stirrer with a volume of 2 L, into which 201.5 g of sodium styrenesulfonate (including 180 g of the styrenesulfonic acid content) and 20 g of hydroxyethyl acrylate were added. Then, 1 g of ammonium persulfate was added into the solution to conduct a polymerization reaction of styrenesulfonic acid and hydroxyethyl acrylate for 12 hours.

Then, 100 g of cation exchange resin [AMBERLITE 120B (commercial name)] manufactured by Organo Corporation was added, and stirred with a stirrer for one hour. Then, it was filtered with filter paper No. 131 manufactured by Toyo Roshi Kaisha, Ltd. The treatment by the cation exchange resin and the filtration was repeated three times to remove all the cationic components in the liquid.

With respect to the copolymer of styrenesulfonic acid and hydroxyethyl acrylate as obtained above, an analysis was made with the HPLC system using the GPC column. The results showed that the copolymer above was estimated to have a weight average molecular weight of 90,000 with a dextran standard.

Production Example 6

Production of Copolymer (Styrenesulfonic Acid:Hydroxyethyl Acrylate=8:2)

Production Example 6 produced a copolymer of monomers consisting of styrenesulfonic acid and hydroxyethyl acrylate at a mass ratio of 8:2, as explained below.

1 L of pure water was added in a separable flask with a stirrer with a volume of 2 L, into which 173.5 g of sodium styrenesulfonate (including 155 g of the styrenesulfonic acid content) and 33 g of hydroxyethyl acrylate were added. Then, 1 g of ammonium persulfate was added into the solution to conduct a polymerization reaction of styrenesulfonic acid and hydroxyethyl acrylate for 12 hours.

Then, into the reaction liquid, 100 g of cation exchange resin [AMBERLITE 120B (a commercial name)] manufactured by Organo Corporation was added, and stirred with a stirrer for one hour. Then, it was filtered with filter paper No. 131 manufactured by Toyo Roshi Kaisha, Ltd. The treatment by the cation exchange resin and the filtration was repeated three times to remove all the cationic components in the liquid.

With respect to the copolymer of styrenesulfonic acid and hydroxyethyl acrylate as obtained above, an analysis was made with the HPLC system using the GPC column. The results showed that the copolymer above was estimated to have a weight average molecular weight of 90,000 with a dextran standard.

Production Example 7

Production of Copolymer (Styrenesulfonic Acid:Hydroxypropyl Methacrylate=9.8:0.2)

Production Example 7 produced a copolymer of monomers consisting of styrenesulfonic acid and hydroxypropyl methacrylate at a mass ratio of 9.8:0.2, as explained below.

1 L of pure water was added in a separable flask with a stirrer with a volume of 2 L, into which 219.4 g of sodium styrenesulfonate (including 196 g of the styrenesulfonic acid content) and 4 g of hydroxypropyl methacrylate were added. Then, 1 g of ammonium persulfate was added into the solution to conduct a polymerization reaction of styrenesulfonic acid and hydroxypropyl methacrylate for 12 hours.

Then, into the reaction liquid, 100 g of cation exchange resin [AMBERLITE 120B (commercial name)] manufactured by Organo Corporation was added, and stirred with a stirrer for one hour. Then, it was filtered with filter paper No. 131 manufactured by Toyo Roshi Kaisha, Ltd. The treatment by the cation exchange resin and the filtration was repeated three times to remove all the cationic components in the liquid.

With respect to the copolymer of styrenesulfonic acid and hydroxypropyl methacrylate as obtained above, an analysis was made with the HPLC system using the GPC column. The results showed that the copolymer above was estimated to have a weight average molecular weight of 100,000 with a dextran standard.

Production Example 8

Production of Copolymer (Styrenesulfonic Acid:Hydroxypropyl Methacrylate=9.5:0.5)

Production Example 8 produced a copolymer of monomers consisting of styrenesulfonic acid and hydroxypropyl methacrylate at a mass ratio of 9.5:0.5, as explained below.

1 L of pure water was added in a separable flask with a stirrer with a volume of 2 L, into which 212.7 g of sodium styrenesulfonate (including 190 g of the styrenesulfonic acid content) and 10 g of hydroxypropyl methacrylate were added. Then, 1 g of ammonium persulfate was added into the solution to conduct a polymerization reaction of styrenesulfonic acid and hydroxylpropyl methacrylate for 12 hours.

Then, into the reaction liquid, 100 g of cation exchange resin [AMBERLITE 120B (commercial name)] manufactured by Organo Corporation was added, and stirred with a stirrer for one hour. Then, it was filtered with filter paper No. 131 manufactured by Toyo Roshi Kaisha, Ltd. The treatment by the cation exchange resin and the filtration was repeated three times to remove all the cationic components in the liquid.

With respect to the copolymer of styrenesulfonic acid and hydroxypropyl methacrylate as obtained above, an analysis was made with the HPLC system using the GPC column. The results showed that the copolymer above was estimated to have a weight average molecular weight of 90,000 with a dextran standard.

Production Example 9

Production of Copolymer (Styrenesulfonic Acid:Hydroxypropyl Methacrylate=9:1)

Production Example 9 produced a copolymer of monomers consisting of styrenesulfonic acid and hydroxypropyl methacrylate at a mass ratio of 9:1, as explained below.

1 L of pure water was added in a separable flask with a stirrer with a volume of 2 L, into which 201.5 g of sodium styrenesulfonate (including 180 g of the styrenesulfonic acid content) and 20 g of hydroxypropyl methacrylate were added. Then, 1 g of ammonium persulfate was added into the solution to conduct a polymerization reaction of styrenesulfonic acid and hydroxylpropyl methacrylate for 12 hours.

Then, into the reaction liquid, 100 g of cation exchange resin [AMBERLITE 120B (commercial name)] manufactured by Organo Corporation was added, and stirred with a stirrer for one hour. Then, it was filtered with filter paper No. 131 manufactured by Toyo Roshi Kaisha, Ltd. The treatment by the cation exchange resin and the filtration was repeated three times to remove all the cationic components in the liquid.

With respect to the copolymer of styrenesulfonic acid and hydroxypropyl methacrylate as obtained above, an analysis was made with the HPLC system using the GPC column. The results showed that the copolymer above was estimated to have a weight average molecular weight of 90,000 with a dextran standard.

Production Example 10

Production of Copolymer (Styrenesulfonic Acid=3-Methacryloxypropyltrimethoxysilane=9:1)

Production Example 10 produced a copolymer of monomers consisting of styrenesulfonic acid and 3-methacryloxypropyltrimethoxysilane at a mass ratio of 9:1, as explained below.

1 L of pure water was added in a separable flask with a stirrer with a volume of 2 L, into which 201.5 g of sodium styrenesulfonate (including 180 g of the styrenesulfonic acid content) and 20 g of 3-methacryloxypropyltrimethoxysilane were added. Then, 1 g of ammonium persulfate was added into the solution to conduct a polymerization reaction of styrenesulfonic acid and 3-methacryloxypropyltrimethoxysilane for 12 hours.

Then, into the reaction liquid, 100 g of cation exchange resin [AMBERLITE 120B (commercial name)] manufactured by Organo Corporation was added, and stirred with a stirrer for one hour. Then, it was filtered with filter paper No. 131 manufactured by Toyo Roshi Kaisha, Ltd. The treatment by the cation exchange resin and the filtration was repeated three times to remove all the cationic components in the liquid.

With respect to the copolymer of styrenesulfonic acid and 3-methacryloxypropyltrimethoxysilane as obtained above, an analysis was made with the HPLC system using the GPC column. The results showed that the copolymer above was estimated to have a weight average molecular weight of 70,000 with a dextran standard.

Production Example 11

Production of Copolymer (Styrenesulfonic Acid:Vinyltrimethoxysilane=9:1)

Production Example 11 produced a copolymer of monomers consisting of styrenesulfonic acid and vinyltrimethoxysilane at a mass ratio of 9:1, as explained below.

1 L of pure water was added in a separable flask with a stirrer with a volume of 2 L, into which 201.5 g of sodium styrenesulfonate (including 180 g of styrenesulfonic acid content) and 20 g of vinyltrimethoxysilane were added. Then, 1 g of ammonium persulfate was added into the solution to conduct a polymerization reaction of styrenesulfonic acid and vinyltrimethoxysilane for 12 hours.

Then, into the reaction liquid, 100 g of cation exchange resin [AMBERLITE 120B (commercial name)] manufactured by Organo Corporation was added, and stirred with a stirrer for one hour. Then, it was filtered with filter paper No. 131 manufactured by Toyo Roshi Kaisha, Ltd. The treatment by the cation exchange resin and the filtration was repeated three times to remove all the cationic components in the liquid.

With respect to the copolymer of styrenesulfonic acid and vinyltrimethoxysilane as obtained above, an analysis was made with the HPLC system using the GPC column. The results showed that the copolymer above was estimated to have a weight average molecular weight of 80,000 with a dextran standard.

Production Example 12

Production of Copolymer (Styrenesulfonic Acid:3-Acryloxypropyltrimethoxysilane=9:1)

Production Example 12 produced a copolymer of monomers consisting of styrenesulfonic acid and 3-acryloxypropyltrimethoxysilane at a mass ratio of 9:1, as explained below.

1 L of pure water was added in a separable flask with a stirrer with a volume of 2 L, into which 201.5 g of sodium styrenesulfonate (including 180 g of the styrenesulfonic acid content) and 20 g of 3-acryloxypropyltrimethoxysilane was added. Then, 1 g of ammonium persulfate was added into the solution to conduct a polymerization reaction of styrenesulfonic acid and vinyltrimethoxysilane for 12 hours.

Then, into the reaction liquid, 100 g of cation exchange resin [AMBERLITE 120B (commercial name)] manufactured by Organo Corporation was added, and stirred with a stirrer for one hour. Then, it was filtered with filter paper No. 131 manufactured by Toyo Roshi Kaisha, Ltd. The treatment by the cation exchange resin and the filtration was repeated three times to remove all the cationic components in the liquid.

With respect to the copolymer of styrenesulfonic acid and 3-acryloxypropyltrimethoxysilane as obtained above, an analysis was made with the HPLC system using the GPC column. The results showed that the copolymer above was estimated to have a weight average molecular weight of 80,000 with a dextran standard.

Production Example 13

Production of Copolymer (Styrenesulfonic Acid:p-Styryltrimethoxysilane=9:1)

Production Example 13 produced a copolymer of monomers consisting of styrenesulfonic acid and p-styryltrimethoxysilane at a mass ratio of 9:1.

1 L of pure water was added in a separable flask with a stirrer with a volume of 2 L, into which 201.5 g of sodium styrenesulfonate (including 180 g of the styrenesulfonic acid content) and 20 g of p-styryltrimethoxysilane was added. Then, 1 g of ammonium persulfate was added into the solution to conduct a polymerization reaction of styrenesulfonic acid and p-styryltrimethoxysilane for 12 hours.

Then, into the reaction liquid, 100 g of cation exchange resin [AMBERLITE 120B (commercial name)] manufactured by Organo Corporation was added, and stirred with a stirrer for one hour. Then, it was filtered with filter paper No. 131 manufactured by Toyo Roshi Kaisha, Ltd. The treatment by the cation exchange resin and the filtration was repeated three times to remove all the cationic components in the liquid.

With respect to the copolymer of styrenesulfonic acid and p-styryltrimethoxysilane as obtained above, an analysis was made with the HPLC system using the GPC column. The results showed that the copolymer above was estimated to have a weight average molecular weight of 90,000 with a dextran standard.

Then, the Examples are explained. Among the Examples, Examples 1 to 52 used a dopant, that is, a copolymer obtained by copolymerizing styrenesulfonic acid with a non-sulfonic acid system monomer. As such a non-sulfonic acid system monomer, α-unsaturated carboxylic ester such as methacrylate or acrylate was used. Among them, Examples 1 to 20 relates to conductive polymer dispersion liquids, Examples 21 to 44 relates to winding-type aluminum solid electrolytic capacitors, and Examples 45 to 52 relates to tantalum solid electrolytic capacitors.

Example 1

600 g of 4% of an aqueous solution of the copolymer of styrenesulfonic acid and hydroxyethyl methacrylate at a mass ratio of 9:1, which was obtained in Production Example 1, were put into a stainless steel container with a volume of 1 L. Therein, 0.3 g of ferrous sulfate 7 hydrate were added as a catalyst, and dissolved. Then, 4 mL of 3,4-ethylenedioxythiophene were dropped slowly. They were stirred with a stirrer spring made of stainless steel. A positive electrode was attached to the container, and a negative electrode was attached to the stirrer spring, and then, a constant current of 1 $mA/cm^2$ was applied therebetween to perform an electrolytic oxidation polymerization for 18 hours to synthesize a conductive polymer. After the electrolytic oxidation polymerization as mentioned above, the mixture was diluted four times with water. Then, using an ultrasonic homogenizer [manufactured by Nippon Seiki Co., Ltd.; US-T300 (commercial name)], a dispersion treatment was performed for 30 minutes.

Then, 100 g of cation exchange resin [AMBERLITE 120B (commercial name)] manufactured by Organo Corporation was added, and the mixture was stirred with a stirrer for one hour. Then, it was filtered with filter paper No. 131 manufactured by Toyo Roshi Kaisha, Ltd. The treatment by the cation exchange resin and the filtration was repeated three times to remove all the cationic components in the liquid.

Thereby treated liquid was filtered with a filter having a pore size of 1 μm, which was then processed with an ultrafiltration device [VIVAFLOW 200 (product name) made by Sartorius Corporation, in a condition of a molecular weight fraction of 50,000], to remove free components of low molecular weights in the liquid. The processed liquid above was diluted with water to as adjust the concentration of the conductive polymer at 3%. To 40 g of the 3% liquid, 4 g of butanediol was added as a conductive improver, to obtain a conductive polymer dispersion liquid in which butanediol has been added as the conductive improver. The quantity of the butanediol added was 333% with respect to the conductive polymer.

Example 2

The copolymer obtained in Production Example 1 was replaced with the copolymer of styrenesulfonic acid and hydroxyethyl methacrylate at a mass ratio of 8:2 obtained in Production Example 2. Other than this replacement, the same procedure as Example 1 was performed to obtain a conductive polymer dispersion liquid. In Example 2, the same procedure as Example 1 was performed to prepare the conductive polymer dispersion liquid, so that the dispersion liquid of the conductive polymer of Example 2 included butanediol in the same manner as Example 1. Note that the addition of the butanediol was the same in the explanation for the dispersion liquid of the conductive polymer of Example 3 or the subsequent Examples.

Example 3

The copolymer obtained in Production Example 1 was replaced with the copolymer of styrenesulfonic acid and hydroxyethyl methacrylate at a mass ratio of 4:6 obtained in production example 3. Other than this replacement, the same procedure as Example 1 was performed to obtain a conductive polymer dispersion liquid.

Example 4

The copolymer obtained in Production Example 1 was replaced with the copolymer of styrenesulfonic acid and glycidyl methacrylate at a mass ratio of 9:1 obtained in production example 4. Other than this replacement, the same procedure as Example 1 was performed to obtain a conductive polymer dispersion liquid.

Example 5

The copolymer obtained in Production Example 1 was replaced with the copolymer of styrenesulfonic acid and hydroxyethyl acrylate at a mass ratio of 9:1 obtained in Production Example 5. Other than this replacement, the same procedure as Example 1 was performed to obtain a conductive polymer dispersion liquid.

Example 6

The copolymer obtained in Production Example 1 was replaced with the copolymer of styrenesulfonic acid and hydroxyethyl acrylate at a mass ratio of 8:2 obtained in Production Example 6. Other than this replacement, the same procedure as Example 1 was performed to obtain a conductive polymer dispersion liquid.

Example 7

The 600 g of the 4% aqueous solution of the copolymer obtained in Production Example 1 was replaced with a mixture as follows. The mixture used here included 300 g of 4% aqueous solution of the copolymer of styrenesulfonic acid and hydroxyethyl methacrylate at a mass ratio of 9:1 obtained in Production Example 1, and 300 g of 4% aqueous solution of polystyrene sulfonic acid manufactured by Tayca Corporation (weight average molecular weight of 100,000). Other than this replacement, the same procedure as Example 1 was performed to obtain a conductive polymer dispersion liquid.

Example 8

The 600 g of the 4% aqueous solution of the copolymer obtained in Production Example 1 was replaced with a mixture as follows. The mixture used here included 300 g of 4% aqueous solution of the copolymer of styrenesulfonic acid and hydroxyethyl methacrylate at a mass ratio of 8:2 obtained in Production Example 2 and 300 g of 4% aqueous solution of polystyrene sulfonic acid manufactured by Tayca Corporation (weight average molecular weight of 100,000). Other than this replacement, the same procedure as Example 1 was performed to obtain a conductive polymer dispersion liquid.

Example 9

The 600 g of the 4% aqueous solution of the copolymer obtained in Production Example 1 was replaced with a mixture as follows. The mixture used here included 300 g of 4% aqueous solution of the copolymer of styrenesulfonic acid and hydroxyethyl methacrylate at a mass ratio of 4:6 obtained in Production Example 3 and 300 g of 4% aqueous solution of polystyrene sulfonic acid manufactured by Tayca Corporation (weight average molecular weight of 100,000). Other than this replacement, the same procedure as Example 1 was performed to obtain a conductive polymer dispersion liquid.

Example 10

The 600 g of the 4% aqueous solution of the copolymer obtained in Production Example 1 was replaced with a mixture as follows. The mixture used here included 300 g of 4% aqueous solution of the copolymer of styrenesulfonic acid and glycidyl methacrylate at a mass ratio of 9:1 obtained in Production Example 4 and 300 g of 4% aqueous solution of polystyrene sulfonic acid manufactured by Tayca Corporation (weight average molecular weight of 100,000). Other than this replacement, the same procedure as Example 1 was performed to obtain a conductive polymer dispersion liquid.

Example 11

The 600 g of the 4% aqueous solution of the copolymer obtained in Production Example 1 was replaced with a mixture as follows. The mixture used here included 300 g of 4% aqueous solution of the copolymer of styrenesulfonic acid and hydroxyethyl acrylate at a mass ratio of 9:1 obtained in Production Example 5 and 300 g of 4% aqueous solution of polystyrene sulfonic acid manufactured by Tayca Corporation (weight average molecular weight of 100,000). Other than this replacement, the same procedure as Example 1 was performed to obtain a conductive polymer dispersion liquid.

Example 12

The 600 g of the 4% aqueous solution of the copolymer obtained in Production Example 1 was replaced with a mixture as follows. The mixture used here included 300 g of 4% aqueous solution of the copolymer of styrenesulfonic acid and hydroxyethyl acrylate at a mass ratio of 8:2 obtained in Production Example 6 and 300 g of 4% aqueous solution of polystyrene sulfonic acid manufactured by Tayca Corporation (weight average molecular weight of 100,000). Other than this replacement, the same procedure as Example 1 was performed to obtain a conductive polymer dispersion liquid.

Example 13

The 600 g of the 4% aqueous solution of the copolymer obtained in Production Example 1 was replaced with a mixture as follows. The mixture used here included 300 g of 4% aqueous solution of the copolymer of styrenesulfonic acid and hydroxyethyl methacrylate at a mass ratio of 8:2 obtained in Production Example 2 and 225 g of 4% aqueous solution of polystyrene sulfonic acid manufactured by Tayca Corporation (weight average molecular weight of 100,000), and 75 g of 4% aqueous solution of phenolsulfonic acid novolac resin [manufactured by Konishi Chemical Ind. Co., Ltd.; weight average molecular weight of 60,000; that is, a compound when R1 in Formula (2) is hydrogen]. Other than this replacement, the same procedure as Example 1 was performed to obtain a conductive polymer dispersion liquid.

Example 14

Example 14 uses a conductive polymer dispersion liquid, in which a sulfonated polyester sample was prepared, which was then mixed with the conductive polymer dispersion liquid obtained in Example 1, as explained below.

200 g of 4% aqueous solution of sulfonated polyester [PLASCOAT Z-561 (commercial name) manufactured by Goo Chemical Co., Ltd.; weight average molecular weight of 27,000] was put into a vessel with an internal volume of 1 L. After adding 2 g of ammonium persulfate as an oxidant, the mixture was stirred with a stirrer for dissolving. Then, 0.4 g of 40% aqueous solution of ferric sulfate was added. While stirring, 3 mL of 3,4-ethylenedioxythiophene was dropped. For 24 hours, a chemical oxidation polymerization of the 3,4-ethylenedioxythiophene was conducted to synthesize a conductive polymer.

After the polymerization above, the mixture was diluted four times with water.

Then, a dispersion treatment was performed with an ultrasonic homogenizer for 30 minutes. Then, 100 g of cation exchange resin [AMBERLITE 120B (commercial name)] manufactured by Organo Corporation was added, and the mixture was stirred for one hour. Then, the mixture was filtered with filter paper No. 131 manufactured by Toyo Roshi Kaisha, Ltd. The treatment by the cation exchange resin and the filtration was repeated three times to remove all the cationic components in the liquid.

Thereby treated liquid was filtered with a filter having a pore size of 1 μm. Thereby filtered liquid was treated with an ultrafiltration device [VIVAFLOW 200 (product name) made by Sartorius Corporation, in a condition of a molecular weight fraction of 50,000] to remove free components of low molecular weights in the liquid. The processed liquid above was diluted with water to as adjust the concentration of the conductive polymer at 3%. To 40 g of the 3% liquid, 4 g of butanediol was added as a conductive improver. As a result, a conductive polymer dispersion liquid was obtained in which sulfonated polyester was a dopant while including butanediol as a conductive improver. The quantity of the butanediol added was 333% with respect to the conductive polymer.

40 g of the conductive polymer dispersion liquid including the sulfonated polyester as a dopant was mixed with 40 g of the conductive polymer dispersion liquid obtained in Example 1, thereby obtaining a mixture liquid of the conductive polymer dispersion liquids including different kinds of dopants.

Example 15

The 40 g of the conductive polymer dispersion liquid obtained in Example 1 was replaced with 40 g of the conductive polymer dispersion liquid obtained in Example 2. Other than the replacement, the same procedure as Example 14 was performed to obtain a mixture liquid of the conductive polymer dispersion liquids including different kinds of dopants.

Example 16

The 40 g of the conductive polymer dispersion liquid obtained in Example 1 was replaced with 40 g of the conductive polymer dispersion liquid obtained in Example 3. Other than the replacement, the same procedure as Example 14 was performed to obtain a mixture liquid of the conductive polymer dispersion liquids including different kinds of dopants.

Example 17

The 40 g of the conductive polymer dispersion liquid obtained in Example 1 was replaced with 40 g of the conductive polymer dispersion liquid obtained in Example 4. Other than the replacement, the same procedure as Example 14 was performed to obtain a mixture liquid of the conductive polymer dispersion liquids including different kinds of dopants.

Example 18

The 40 g of the conductive polymer dispersion liquid obtained in Example 1 was replaced with 40 g of the conductive polymer dispersion liquid obtained in Example 5. Other than the replacement, the same procedure as Example 14 was performed to obtain a mixture liquid of the conductive polymer dispersion liquids including different kinds of dopants.

Example 19

The 40 g of the conductive polymer dispersion liquid obtained in Example 1 was replaced with 40 g of the conductive polymer dispersion liquid obtained in Example 6. Other than the replacement, the same procedure as Example 14 was performed to obtain a mixture liquid of the conductive polymer dispersion liquids including different kinds of dopants.

Example 20

The 40 g of the conductive polymer dispersion liquid obtained in Example 1 was replaced with 40 g of the conductive polymer dispersion liquid obtained in Example 8. Other than the replacement, the same procedure as Example 14 was performed to obtain a mixture liquid of the conductive polymer dispersion liquids including different kinds of dopants.

Comparison Example 1

The 600 g of the 4% aqueous solution of the copolymer of styrenesulfonic acid and hydroxyethyl methacrylate at a mass ratio of 9:1 obtained in Production Example 1 was replaced with 600 g of 4% aqueous solution of polystyrene sulfonic acid (manufactured by Tayca Corporation; weight average molecular weight of 100,000). Other than the replacement above, the same procedure as Example 1 was performed to obtain a conductive polymer dispersion liquid including butanediol as a conductive improver.

Comparison Example 2

The 600 g of the 4% aqueous solution of the copolymer of styrenesulfonic acid and hydroxyethyl methacrylate at a mass ratio of 9:1 obtained in Production Example 1 was replaced with 600 g of a mixture of: 300 g of 4% aqueous solution of polystyrene sulfonic acid (manufactured by Tayca Corporation; weight average molecular weight of 100,000); and 300 g of 4% aqueous solution of phenolsulfonic acid novolac resin [manufactured by Konishi Chemical Ind. Co., Ltd., average molecular weight of 60,000, a compound when R1 in Formula (2) is hydrogen]. Other than the replacement above, the same procedure as Production Example 1 was performed to obtain a conductive polymer dispersion liquid including butanediol as a conductive improver.

Evaluation (1)

Winding-Type Aluminum Solid Electrolytic Capacitor

Examples 21 to 32 and Comparative Examples 3 and 4

In Examples 21 to 32 and Comparative Examples 3 and 4, winding-type aluminum solid electrolytic capacitors were produced and their characteristics were evaluated, as explained below. Based on the evaluation results, the conductive polymer dispersion liquid of Examples 1 to 12 and the conductive polymer dispersion liquids of Comparative Examples 1 and 2 were evaluated as well.

A surface of an aluminum foil was applied to an etching treatment. Then, a conversion treatment was performed to form a dielectric layer, and a lead terminal was attached to its positive electrode. Also, a lead terminal is attached to a negative electrode made of an aluminum foil. The positive electrode and the negative electrode, both having the lead terminals, were wound with an intervention of a separator to prepare a capacitor element.

20 pieces of the capacitor elements as explained above were provided for each of Examples 21 to 32 and Comparative Examples 3 and 4. Each capacitor element was separately immersed for ten minutes in the conductive polymer dispersion liquid of each of Examples 1 to 12 and Comparative Examples 1 and 2. Then, it was taken out and dried at 150° C. for 30 minutes. The process above was repeated three times to form a solid electrolyte layer consisting of the conductive polymer. Then, an exterior material was provided outside. There were obtained 20 samples of winding-type aluminum solid electrolytic capacitors for each of Examples 21 to 32 and Comparative Examples 3 and 4.

With respect to the winding-type aluminum solid electrolytic capacitors of Examples 21 to 32 and Comparative Examples 3 and 4, the ESR and the capacitance were measured, as well as the leakage current was measured to check whether the leakage current occurred. Table 1 shows the kind of the conductive polymer dispersion liquids along with the results. Here, the followings are the measuring methods of the ESR, the capacitance and the leakage current, as well as the evaluation method of the occurrence of the leakage current.

ESR:
Using an LCR meter (4,284 A) made by HEWLETTPACKARD Corporation, it was measured at 100 kHz at a condition of 25° C.

Capacitance:
Using an LCR meter (4,284 A) made by HEWLETTPACKARD Corporation, it was measured at 120 Hz at a condition of 25° C.

Leakage Current:
A rated voltage of 35V was applied to the winding-type aluminum solid electrolytic capacitor at 25° C. for 60 seconds. Then, a leakage current was measured with a digital oscilloscope.

Occurrence of Leakage Current:
When measuring the leakage current above, the sample when it had a leakage current of 100 µA or more was judged as occurrence of having a leakage current.

The measurements above were performed on 20 samples for each Example. The numerical values of the ESR and the capacitance in Table 1 were obtained by averaging 20 samples while rounding off the number of decimal places. Regarding the results of the occurrence of the leakage current, Table 1 shows the total number of the examined samples in the denominator, and the number of finding the occurrence of the leakage current in the numerator. That is, the number in the numerator here is the "number of leakage current defectiveness occurrence."

TABLE 1

| | Conductive polymer dispersion liquid used | ESR (mΩ) | Capacitance (µF) | Number of leakage current defectiveness occurrence |
|---|---|---|---|---|
| Ex. 21 | Ex. 1 | 11 | 51 | 0/20 |
| Ex. 22 | Ex. 2 | 10 | 51 | 0/20 |
| Ex. 23 | Ex. 3 | 12 | 52 | 0/20 |
| Ex. 24 | Ex. 4 | 11 | 52 | 0/20 |
| Ex. 25 | Ex. 5 | 11 | 52 | 0/20 |
| Ex. 26 | Ex. 6 | 10 | 52 | 0/20 |
| Ex. 27 | Ex. 7 | 10 | 51 | 0/20 |
| Ex. 28 | Ex. 8 | 9 | 51 | 0/20 |
| Ex. 29 | Ex. 9 | 9 | 52 | 0/20 |
| Ex. 30 | Ex. 10 | 9 | 52 | 0/20 |
| Ex. 31 | Ex. 11 | 10 | 52 | 0/20 |
| Ex. 32 | Ex. 12 | 10 | 52 | 0/20 |
| Comp. Ex. 3 | Comp. Ex. 1 | 18 | 50 | 1/20 |
| Comp. Ex. 4 | Comp. Ex. 2 | 16 | 50 | 1/20 |

After measuring the characteristics above, while the winding-type aluminum solid electrolytic capacitors (each by ten) of Examples 21 to 32 and Comparative Examples 3 and 4 (10 samples for each Example) were applied to a rated voltage of 35V, they were stored in a standstill state in a constant-temperature bath of 150° C. After 100 hours, the ESR and the capacitance were measured in the same manner as explained before. When a leakage current exceeded 500 µA during the storage period, it was judged as short defectiveness (short circuit defectiveness). The results are shown in Table 2. Here, regarding the short defectiveness, the total number of the capacitors examined is shown in the denominator, while the number of capacitors resulting in the short defectiveness is shown in the numerator.

TABLE 2

|  | Conductive polymer dispersion liquid used | ESR (mΩ) | Capacitance (µF) | Short defectiveness |
|---|---|---|---|---|
| Ex. 21 | Ex. 1 | 12 | 50 | 0/10 |
| Ex. 22 | Ex. 2 | 11 | 50 | 0/10 |
| Ex. 23 | Ex. 3 | 13 | 51 | 0/10 |
| Ex. 24 | Ex. 4 | 12 | 51 | 0/10 |
| Ex. 25 | Ex. 5 | 12 | 51 | 0/10 |
| Ex. 26 | Ex. 6 | 11 | 51 | 0/10 |
| Ex. 27 | Ex. 7 | 10 | 50 | 0/10 |
| Ex. 28 | Ex. 8 | 9 | 50 | 0/10 |
| Ex. 29 | Ex. 9 | 9 | 51 | 0/10 |
| Ex. 30 | Ex. 10 | 9 | 51 | 0/10 |
| Ex. 31 | Ex. 11 | 10 | 51 | 0/10 |
| Ex. 32 | Ex. 12 | 10 | 51 | 0/10 |
| Comp. Ex. 3 | Comp. Ex. 1 | 23 | 49 | 2/10 |
| Comp. Ex. 4 | Comp. Ex. 2 | 19 | 49 | 1/10 |

As shown in Table 1, the winding-type aluminum solid electrolytic capacitors of Examples 21 to 32 (The winding-type aluminum solid electrolytic capacitor may be simply referred to as "capacitor.") had a lower (smaller) ESR than the capacitors of Comparative Examples 3 and 4. Also, they did not show the occurrence of the leakage current unlike the capacitors of Comparative Examples 3 and 4. Table 2 also shows that after 100 hours storage in the constant-temperature bath at 150° C., the capacitors of Examples 21 to 32 had lower ESR than the capacitors of Comparative Examples 3 and 4. Also, the capacitors of Examples 21 to 32 had little increase of the ESR during the high temperature storage. In addition, there was no short defectiveness unlike the capacitors of Comparative Examples 3 and 4, indicating that they are reliable to be used under a hot condition.

Evaluation (2)

Winding-Type Aluminum Solid Electrolytic Capacitor

Examples 33 to 44, and Comparative Examples 5 and 6

In Examples 33 to 44 and Comparative Examples 5 and 6, a winding-type aluminum solid electrolytic capacitor was prepared by using a solid electrolyte of a conductive polymer together with an electrolyte, and then, its characteristics were evaluated. Here, in these winding-type aluminum solid electrolytic capacitors, an electrolyte was used in addition to the solid electrolyte made of a conductive polymer, but they still included a solid electrolyte. Therefore, these capacitors are still referred to as a winding-type aluminum solid electrolytic capacitor.

A surface of an aluminum foil was applied to an etching treatment. Then, a conversion treatment was performed to form a dielectric layer, and a lead terminal was attached to its positive electrode. Also, a lead terminal is attached to a negative electrode made of an aluminum foil. The positive electrode and the negative electrode, both having the lead terminals, were wound with an intervention of a separator to prepare a capacitor element.

20 samples of the capacitor elements as mentioned above were provided for each of Examples 33 to 34 and Comparative Examples 5 and 6. Each capacitor element was separately immersed for ten minutes in the conductive polymer dispersion liquid of each of Examples 1 to 12 and Comparative Examples 1 and 2. Then, it was taken out and dried at 150° C. for 30 minutes. The process above was repeated 2 times to form a solid electrolyte layer consisting of the conductive polymer. The capacitor element mentioned above was immersed in a 10% ethyleneglycol solution of trimethylamine adipate (i.e., an ethylene glycol solution in which 10% of trimethylamine adipate is dissolved) as an electrolyte for ten minutes. After taking it out, an exterior material was provided. Thereby, 20 samples of the winding-type aluminum solid electrolytic capacitors of each of Examples 33 to 44 and Comparative Examples 5 and 6 were obtained.

With respect to the winding-type aluminum electrolytic capacitors of Examples 33 to 44 and Comparative Examples 5 and 6 as obtained above, in the same manner as explained before, the ESR and the capacitance were measured, as well as the leakage current was measured to examine the occurrence of the leakage current defectiveness.

The results are shown in Table 3 in the same manner as Table 1.

TABLE 3

|  | Conductive polymer dispersion liquid used | ESR (mΩ) | Capacitance (µF) | Number of leakage current defectiveness occurrence |
|---|---|---|---|---|
| Ex. 33 | Ex. 1 | 10 | 105 | 0/20 |
| Ex. 34 | Ex. 2 | 9 | 105 | 0/20 |
| Ex. 35 | Ex. 3 | 10 | 106 | 0/20 |
| Ex. 36 | Ex. 4 | 10 | 105 | 0/20 |
| Ex. 37 | Ex. 5 | 10 | 105 | 0/20 |
| Ex. 38 | Ex. 6 | 9 | 106 | 0/20 |
| Ex. 39 | Ex. 7 | 9 | 105 | 0/20 |
| Ex. 40 | Ex. 8 | 8 | 105 | 0/20 |
| Ex. 41 | Ex. 9 | 8 | 106 | 0/20 |
| Ex. 42 | Ex. 10 | 9 | 105 | 0/20 |
| Ex. 43 | Ex. 11 | 9 | 105 | 0/20 |
| Ex. 44 | Ex. 12 | 8 | 106 | 0/20 |
| Comp. Ex. 5 | Comp. Ex. 1 | 16 | 103 | 1/20 |
| Comp. Ex. 6 | Comp. Ex. 2 | 14 | 105 | 1/20 |

Also, after the measurements of the characteristics above, the winding-type aluminum solid electrolytic capacitors of Examples 33 to 44 and Comparative Examples 5 and 6 (10 samples for each Example) were applied to a rated voltage of 35V, and then, they were stored in a standstill state in a constant-temperature bath of 150° C. After 100 hours, the ESR and the capacitance were measured in the same manner as explained before. When the leakage current exceeded 500 µA during the storage period, such a capacitor was judged as short defectiveness. The results are shown in Table 4 in the same manner as Table 2.

TABLE 4

|  | Conductive polymer dispersion liquid used | ESR (mΩ) | Capacitance (µF) | Short defectiveness |
|---|---|---|---|---|
| Ex. 33 | Ex. 1 | 11 | 105 | 0/10 |
| Ex. 34 | Ex. 2 | 10 | 105 | 0/10 |
| Ex. 35 | Ex. 3 | 11 | 106 | 0/10 |
| Ex. 36 | Ex. 4 | 11 | 105 | 0/10 |
| Ex. 37 | Ex. 5 | 11 | 105 | 0/10 |
| Ex. 38 | Ex. 6 | 10 | 106 | 0/10 |
| Ex. 39 | Ex. 7 | 10 | 105 | 0/10 |
| Ex. 40 | Ex. 8 | 8 | 105 | 0/10 |

TABLE 4-continued

| | Conductive polymer dispersion liquid used | ESR (mΩ) | Capacitance (μF) | Short defectiveness |
|---|---|---|---|---|
| Ex. 41 | Ex. 9 | 8 | 106 | 0/10 |
| Ex. 42 | Ex. 10 | 9 | 105 | 0/10 |
| Ex. 43 | Ex. 11 | 9 | 105 | 0/10 |
| Ex. 44 | Ex. 12 | 8 | 106 | 0/10 |
| Comp. Ex. 5 | Comp. Ex. 1 | 24 | 103 | 1/10 |
| Comp. Ex. 6 | Comp. Ex. 2 | 20 | 105 | 1/10 |

As shown in Table 3, when the winding-type aluminum solid electrolytic capacitors of Examples 33 to 44 (the winding-type aluminum solid electrolytic capacitor is hereinafter simply referred to as "capacitor.") are compared with capacitors of Comparative Examples 5 and 6, the formers had low (small) ESR and were free from occurrence of the leakage current defectiveness unlike the latter (i.e., the capacitors of Comparative Examples 5 and 6). As shown in Table 4, even after the storage in the constant-temperature bath at 150° C. for 100 hours, the capacitors of Examples 33 to 44 had lower ESR than the capacitors of Comparative Examples 5 and 6. Also, the capacitors of Examples 33 to 44 had little increase of the ESR during the high temperature storage. In addition, there was no occurrence of the short defectiveness unlike the capacitors of Comparative Examples 5 and 6, thereby indicating that they are reliable to be used under a hot condition.

Evaluation (1)

Tantalum Solid Electrolytic Capacitors

Example 45

In Example 45 and subsequent Examples 46 to 52, and Comparative Examples 7 and 8, tantalum solid electrolytic capacitors were produced to evaluate their characteristics.

A tantalum sintered body was immersed in a 0.1% phosphorus acid aqueous solution, where it was applied to a conversion treatment by applying a voltage of 35V. Thereby, an oxide layer was formed on the surface of the tantalum sintered body, that is, a dielectric layer, to obtain a capacitor element.

The capacitor element above was immersed in a 35% ethanol solution of 3,4-ethylenedioxythiophene solution. After one minute, it was taken out, and kept still for five minutes. Then, it was immersed in an oxidant and dopant solution as prepared in advance. Here, the oxidant and dopant solution was a mixture of a 50% butylamine phenolsulfonate aqueous solution (pH 5) and a 30% ammonium persulfate aqueous solution at a mass ratio of 1:1. After 30 seconds, it was taken out, and kept still at room temperature for 30 minutes. Then, it was heated at 50° C. for ten minutes for carrying out polymerization. After the polymerization, the capacitor element was immersed in water. After 30 minutes of keeping still therein, it was taken out and dried at 70° C. for 30 minutes. The process above was repeated six times to form a solid electrolyte layer of a conductive polymer on the capacitor element.

As explained above, the capacitor element has formed the solid electrolyte layer of the conductive polymer by means of so-called "on-site polymerization," and then, it was immersed in a conductive polymer dispersion liquid obtained in Example 13. After 30 seconds, it was taken out and dried at 150° C. for 30 minutes. The process above was repeated three times. Then, it was kept still at 150° C. for 60 minutes to form a solid electrolyte layer of a conductive polymer of the present invention. Then, the solid electrolyte layer above was covered with carbon paste and silver paste to obtain a tantalum solid electrolytic capacitor.

Example 46

The conductive polymer dispersion liquid of Example 13 was replaced with a conductive polymer dispersion liquid of Example 14. Except for the replacement, the same procedure as Example 45 was performed to obtain a tantalum solid electrolytic capacitor.

Example 47

The conductive polymer dispersion liquid of Example 13 was replaced with a conductive polymer dispersion liquid of Example 15. Except for the replacement, the same procedure as Example 45 was performed to obtain a tantalum solid electrolytic capacitor.

Example 48

The conductive polymer dispersion liquid of Example 13 was replaced with a conductive polymer dispersion liquid of Example 16. Except for the replacement, the same procedure as Example 45 was performed to obtain a tantalum solid electrolytic capacitor.

Example 49

The conductive polymer dispersion liquid of Example 13 was replaced with a conductive polymer dispersion liquid of Example 17. Except for the replacement, the same procedure as Example 45 was performed to obtain a tantalum solid electrolytic capacitor.

Example 50

The conductive polymer dispersion liquid of Example 13 was replaced with a conductive polymer dispersion liquid of Example 18. Except for the replacement, the same procedure as Example 45 was performed to obtain a tantalum solid electrolytic capacitor.

Example 51

The conductive polymer dispersion liquid of Example 13 was replaced with a conductive polymer dispersion liquid of Example 19. Except for the replacement, the same procedure as Example 45 was performed to obtain a tantalum solid electrolytic capacitor.

Example 52

The conductive polymer dispersion liquid of Example 13 was replaced with a conductive polymer dispersion liquid of Example 20. Except for the replacement, the same procedure as Example 45 was performed to obtain a tantalum solid electrolytic capacitor.

Comparative Example 7

The conductive polymer dispersion liquid of Example 13 was replaced with a conductive polymer dispersion liquid of Comparative Example 1. Except for the replacement, the same procedure as Example 45 was performed to obtain a tantalum solid electrolytic capacitor.

Comparative Example 8

The conductive polymer dispersion liquid of Example 13 was replaced with a conductive polymer dispersion liquid of Comparative Example 2. Except for the replacement, the same procedure as Example 45 was performed to obtain a tantalum solid electrolytic capacitor.

With respect to the tantalum solid electrolytic capacitors of Examples 45 to 52 and Comparative Examples 7 and 8, in the same manner as explained before, the ESR and the capacitance were measured. Table 5 shows the kind of the conductive polymer dispersion liquids along with the results. In the measurements of ESR and the capacitance, to samples were provided for each Example. The values of the ESR and the capacitance in Table 5 were obtained by averaging the results of the ten samples while rounding off the number of decimal places.

TABLE 5

|  | Conductive polymer dispersion liquid used | ESR (mΩ) | Capacitance (μF) |
| --- | --- | --- | --- |
| Ex. 45 | Ex. 13 | 15 | 51 |
| Ex. 46 | Ex. 14 | 18 | 51 |
| Ex. 47 | Ex. 15 | 14 | 52 |
| Ex. 48 | Ex. 16 | 14 | 51 |
| Ex. 49 | Ex. 17 | 17 | 51 |
| Ex. 50 | Ex. 18 | 17 | 51 |
| Ex. 51 | Ex. 19 | 16 | 51 |
| Ex. 52 | Ex. 20 | 16 | 51 |
| Comp. Ex. 7 | Comp. Ex. 1 | 30 | 50 |
| Comp. Ex. 8 | Comp. Ex. 2 | 23 | 51 |

In addition, 10 samples of the tantalum solid electrolytic capacitors of each of Examples 45 to 52 and Comparative Examples 7 and 8 were stored at 125° C. for 100 hours. In the same manner as explained before, the ESR and the capacitance were measured. The results are shown in Table 6 in the same manner as Table 5.

TABLE 6

|  | Conductive polymer dispersion liquid used | ESR (mΩ) | Capacitance (μF) |
| --- | --- | --- | --- |
| Ex. 45 | Ex. 13 | 16 | 50 |
| Ex. 46 | Ex. 14 | 19 | 50 |
| Ex. 47 | Ex. 15 | 15 | 51 |
| Ex. 48 | Ex. 16 | 15 | 50 |
| Ex. 49 | Ex. 17 | 18 | 50 |
| Ex. 50 | Ex. 18 | 17 | 51 |
| Ex. 51 | Ex. 19 | 16 | 50 |
| Ex. 52 | Ex. 20 | 17 | 50 |
| Comp. Ex. 7 | Comp. Ex. 1 | 67 | 48 |
| Comp. Ex. 8 | Comp. Ex. 2 | 26 | 50 |

As shown in Table 5, when the tantalum solid electrolytic capacitors of Examples 45 to 52 (the tantalum solid electrolytic capacitor is hereinafter simply referred to as "capacitor.") are compared with the capacitors of Comparative Examples 7 and 8, the former had low ESR, indicating superior characteristics as a capacitor than the latter. Also, as shown in Table 6, the capacitors of Examples 45 to 52 had lower ESR than capacitors of Comparative Examples 7 and 8 even after the storage at 125° C. for 100 hours. Also, the capacitors of Examples 45 to 52 had little increase of the ESR during the high temperature storage, thereby indicating that they are reliable to be used under a hot condition.

Next, the following Examples are ones in which in order to synthesize a copolymer to be used as a dopant, styrenesulfonic acid was copolymerized with a non-sulfonic acid system monomer, which was an unsaturated hydrocarbon containing alkoxysilane compound. In such Examples, Examples 53 to 64 relate to conductive polymer dispersion liquids. Examples 65 to 80 relate winding-type aluminum solid electrolytic capacitors. Examples 81 to 84 relate to tantalum solid electrolytic capacitors.

Preparation of Conductive Polymer Dispersion Liquid

Example 53

The copolymer obtained in Production Example 1 was replaced with the copolymer of styrenesulfonic acid and 3-methacryloxypropyltrimethoxysilane at a mass ratio of 9:1 obtained in Production Example 10. Other than this replacement, the same procedure as Example 1 was performed to obtain a conductive polymer dispersion liquid. In Example 53, the same procedure as Example 1 was performed to prepare the conductive polymer dispersion liquid, so that the dispersion liquid of the conductive polymer of Example 53 included butanediol in the same manner as Example 1. Note that the addition of the butanediol was the same in the explanation for the dispersion liquid of the conductive polymer of Example 54 or subsequent Examples.

Example 54

The copolymer obtained in Production Example 1 was replaced with a copolymer of styrenesulfonic acid and vinyltrimethoxysilane at a mass ratio of 9:1 obtained in Production Example 11. Other than the replacement, the same procedure as Example 1 was performed to obtain a conductive polymer dispersion liquid.

Example 55

The copolymer obtained in Production Example 1 was replaced with a copolymer of styrenesulfonic acid and 3-acryloxypropyltrimethoxysilane at a mass ratio of 9:1 obtained in Production Example 12. Other than the replacement, the same procedure as Example 1 was performed to obtain a conductive polymer dispersion liquid.

Example 56

The copolymer obtained in Production Example 1 was replaced with a copolymer of styrenesulfonic acid and p-styryltrimethoxysilane at a mass ratio of 9:1 obtained in Production Example 13. Other than the replacement, the same procedure as Example 1 was performed to obtain a conductive polymer dispersion liquid.

Example 57

The 600 g of the 4% aqueous solution of the copolymer obtained in Production Example 1 was replaced with a mixture as follows. The mixture used here included 300 g of 4% aqueous solution of the copolymer of styrenesulfonic acid and 3-methacryloxypropyltrimethoxysilane at a mass ratio of 9:1 obtained in Production Example 10 and 300 g of 4% aqueous solution of polystyrene sulfonic acid manufactured by Tayca Corporation (weight average molecular weight of 100,000). Other than this replacement, the same procedure as Example 1 was performed to obtain a conductive polymer dispersion liquid.

Example 58

The 600 g of the 4% aqueous solution of the copolymer obtained in Production Example 1 was replaced with a mixture as follows. The mixture used here included 300 g of 4% aqueous solution of the copolymer of styrenesulfonic acid and vinyltrimethoxysilane at a mass ratio of 9:1 obtained in Production Example 11 and 300 g of 4% aqueous solution of polystyrene sulfonic acid manufactured by Tayca Corporation (weight average molecular weight of 100,000). Other than this replacement, the same procedure as Example 1 was performed to obtain a conductive polymer dispersion liquid.

Example 59

The 600 g of the 4% aqueous solution of the copolymer obtained in Production Example 1 was replaced with a mixture as follows. The mixture used here included 300 g of 4% aqueous solution of the copolymer of styrenesulfonic acid and 3-acryloxypropyltrimethoxysilane at a mass ratio of 9:1 obtained in Production Example 12 and 300 g of 4% aqueous solution of polystyrene sulfonic acid manufactured by Tayca Corporation (weight average molecular weight of 100,000). Other than this replacement, the same procedure as Example 1 was performed to obtain a conductive polymer dispersion liquid.

Example 60

The 600 g of the 4% aqueous solution of the copolymer obtained in Production Example 1 was replaced with a mixture as follows. The mixture used here included 300 g of 4% aqueous solution of the copolymer of styrenesulfonic acid and p-styryltrimethoxysilane at a mass ratio of 9:1 obtained in Production Example 13 and 300 g of 4% aqueous solution of polystyrene sulfonic acid manufactured by Tayca Corporation (weight average molecular weight of 100,000). Other than this replacement, the same procedure as Example 1 was performed to obtain a conductive polymer dispersion liquid.

Example 61

The 40 g of the conductive polymer dispersion liquid obtained in Example 1 was replaced with 40 g of the conductive polymer dispersion liquid obtained in Example 53. Other than the replacement, the same procedure as Example 14 was performed to obtain a mixture liquid of the conductive polymer dispersion liquids including different kinds of dopants.

Example 62

The 40 g of the conductive polymer dispersion liquid obtained in Example 1 was replaced with 40 g of the conductive polymer dispersion liquid obtained in Example 54. Other than the replacement, the same procedure as Example 14 was performed to obtain a mixture liquid of the conductive polymer dispersion liquids including different kinds of dopants.

Example 63

The 40 g of the conductive polymer dispersion liquid obtained in Example 1 was replaced with 40 g of the conductive polymer dispersion liquid obtained in Example 55. Other than the replacement, the same procedure as Example 14 was performed to obtain a mixture liquid of the conductive polymer dispersion liquids including different kinds of dopants.

Example 64

The 40 g of the conductive polymer dispersion liquid obtained in Example 1 was replaced with 40 g of the conductive polymer dispersion liquid obtained in Example 56. Other than the replacement, the same procedure as Example 14 was performed to obtain a mixture liquid of the conductive polymer dispersion liquids including different kinds of dopants.

Evaluation (3)

Winding-Type Aluminum Solid Electrolytic Capacitor

Example 65 to 72 and Comparative Examples 9 and 10

The evaluation (3) of the winding-type aluminum solid electrolytic capacitor was made as follows. Using the conductive polymer dispersion liquid of Examples 53 to 60, a winding-type aluminum solid electrolytic capacitor of Examples 65 to 72 was prepared. To compare with the above, using the conductive polymer of Comparative Example 1 with the polystyrene sulfonic acid as a dopant, a winding-type aluminum solid electrolytic capacitor of Comparative Example 9 was prepared in the same procedure as Examples 65 to 72. In addition, using the conductive polymer dispersion liquid of Comparative Example 2 prepared by using both polystyrene sulfonic acid and phenolsulfonic acid novolac resin as a dopant, a winding-type aluminum solid electrolytic capacitor of Comparative Example 10 was prepared in the same procedure as Examples 65 to 72. Then, the characteristics thereof were evaluated.

The details thereof are explained below.

A surface of an aluminum foil was applied to an etching treatment. Then, a conversion treatment was performed to form a dielectric layer, and a lead terminal was attached to its positive electrode. Also, a lead terminal is attached to a negative electrode made of an aluminum foil. The positive electrode and the negative electrode, both having the lead terminals, were wound with an intervention of a separator to prepare a capacitor element.

20 samples of the capacitor elements as mentioned above for each of Examples 65 to 72 and Comparative Examples 9 and 10 were provided. Each capacitor element was separately immersed for ten minutes in the conductive polymer dispersion liquid of each of Examples 53 to 60 and Comparative Examples 1 and 2. Then, it was taken out and dried at 150° C. for 30 minutes. The process above was repeated three times to form a solid electrolyte layer consisting of the conductive polymer. An exterior material was provided the outside thereof. Thereby, 20 samples of winding-type aluminum solid electrolytic capacitors of each of Examples 65 to 72 and Comparative Examples 9 and 10 were obtained.

With respect to the winding-type aluminum solid electrolytic capacitors of Examples 65 to 72 and Comparative Examples 9 and 10 as obtained above, in the same manner as explained before, the ESR and the capacitance were measured, as well as the leakage current was measured to examine the occurrence of the leakage current defectiveness. Table 7 shows the results along with the kind of the conductive polymer dispersion liquid in the same manner as Table 1.

TABLE 7

| | Conductive polymer dispersion liquid used | ESR (mΩ) | Capacitance (μF) | Number of leakage current defectiveness occurrence |
|---|---|---|---|---|
| Ex. 65 | Ex. 53 | 11 | 51 | 0/20 |
| Ex. 66 | Ex. 54 | 11 | 51 | 0/20 |
| Ex. 67 | Ex. 55 | 11 | 52 | 0/20 |
| Ex. 68 | Ex. 56 | 10 | 51 | 0/20 |
| Ex. 69 | Ex. 57 | 9 | 52 | 0/20 |
| Ex. 70 | Ex. 58 | 9 | 51 | 0/20 |
| Ex. 71 | Ex. 59 | 9 | 52 | 0/20 |
| Ex. 72 | Ex. 60 | 8 | 51 | 0/20 |
| Comp. Ex. 9 | Comp. Ex. 1 | 18 | 50 | 1/20 |
| Comp. Ex. 10 | Comp. Ex. 2 | 16 | 50 | 1/20 |

In addition, after the measurements of the characteristics above, the winding-type aluminum solid electrolytic capacitors of Examples 65 to 72 and Comparative Examples 9 and 10 (ten samples for each Example) were applied to a rated voltage of 35V. They were stored in a standstill state in a constant-temperature bath of 150° C. After 100 hours, the ESR and the capacitance were measured in the same manner as explained before. When a leakage current exceeded 500 μA during the storage period, it was judged as short defectiveness (short circuit defectiveness). The results are shown in Table 8 in the same manner as Table 2.

TABLE 8

| | Conductive polymer dispersion liquid used | ESR (mΩ) | Capacitance (μF) | Short defectiveness |
|---|---|---|---|---|
| Ex. 65 | Ex. 53 | 12 | 51 | 0/10 |
| Ex. 66 | Ex. 54 | 12 | 51 | 0/10 |
| Ex. 67 | Ex. 55 | 12 | 52 | 0/10 |
| Ex. 68 | Ex. 56 | 10 | 51 | 0/10 |
| Ex. 69 | Ex. 57 | 9 | 52 | 0/10 |
| Ex. 70 | Ex. 58 | 9 | 51 | 0/10 |
| Ex. 71 | Ex. 59 | 9 | 52 | 0/10 |
| Ex. 72 | Ex. 60 | 8 | 51 | 0/10 |
| Comp. Ex. 9 | Comp. Ex. 1 | 23 | 49 | 2/10 |
| Comp. Ex. 10 | Comp. Ex. 2 | 19 | 49 | 1/10 |

As shown in Table 7, the winding-type aluminum solid electrolytic capacitors of Examples 65 to 72 (here, the winding-type aluminum solid electrolytic capacitor is hereinafter simply referred to as "capacitor.") had lower (smaller) ESR than capacitors of Comparative Examples 9 and 10, and were free from the occurrence of the leakage current defectiveness unlike the capacitors of Comparative Examples 9 and 10. Also, as shown in Table 8, even after the storage in the constant-temperature bath at 150° C. for 100 hours, the capacitors of Examples 65 to 72 had lower ESR than the capacitors of Comparative Examples 9 and 10.

Also, the capacitors of Examples 65 to 72 had little increase of the ESR during the high temperature storage. In addition, there was no occurrence of the short defectiveness unlike the capacitors of Comparative Examples 9 and 10, thereby indicating that the inventive capacitors are reliable to be used under a hot condition.

Evaluation (4)

Winding-Type Aluminum Solid Electrolytic Capacitor

Examples 73 and 80 and Comparative Examples 11 and 12

The evaluation (4) of the winding-type aluminum solid electrolytic capacitor was made as follows. Using a solid electrolyte of a conductive polymer and an electrolyte, a winding-type aluminum solid electrolytic capacitor was prepared, and properties thereof were evaluated. With respect to the winding-type aluminum solid electrolytic capacitors of Examples 73 to 80, conductive polymer dispersion liquids of Examples 53 to 60 were used. To compare with the above, the conductive polymer dispersion liquids of Comparative Examples 1 and 2 were used in Comparative Examples 11 and 12 in the same manner as the winding-type aluminum solid electrolytic capacitor in the evaluation (3). The details thereof are explained below.

A surface of an aluminum foil was applied to an etching treatment. Then, a conversion treatment was performed to form a dielectric layer, and a lead terminal was attached to its positive electrode. Also, a lead terminal is attached to a negative electrode made of an aluminum foil. The positive electrode and the negative electrode, both having the lead terminals, were wound with an intervention of a separator to prepare a capacitor element.

20 samples of the capacitor elements mentioned above were provided for each of Examples 73 to 80 and Comparative Examples 11 and 12. Each capacitor element was separately immersed for ten minutes in the conductive polymer dispersion liquid of each of Examples 53 to 60 and Comparative Examples 1 and 2. Then, it was taken out and dried at 150° C. for 30 minutes. The process above was repeated 2 times to form a solid electrolyte layer consisting of the conductive polymer. Then, the capacitor element mentioned above was immersed in a 10% ethyleneglycol solution of trimethylamine adipate (i.e., an ethylene glycol solution in which trimethylamine adipate is dissolved at 10%) as an electrolyte for ten minutes. After taken it out, an exterior material was provided the outside thereof. Thereby, 20 samples of the winding-type aluminum solid electrolytic capacitors of each of Examples 73 to 80 and Comparative Examples 11 and 12 were obtained.

With respect to the winding-type aluminum electrolytic capacitors of Examples 73 to 80 and Comparative Example 11 and 12, in the same manner as explained before, the ESR and the capacitance were measured, as well as the leakage current was measured to examine the occurrence of the leakage current defectiveness. The results are shown in Table 9 in the same manner as Table 3.

TABLE 9

| | Conductive polymer dispersion liquid used | ESR (mΩ) | Capacitance (μF) | Number of leakage current defectiveness occurrence |
|---|---|---|---|---|
| Ex. 73 | Ex. 53 | 10 | 51 | 0/20 |
| Ex. 74 | Ex. 54 | 10 | 51 | 0/20 |
| Ex. 75 | Ex. 55 | 10 | 52 | 0/20 |
| Ex. 76 | Ex. 56 | 9 | 51 | 0/20 |
| Ex. 77 | Ex. 57 | 8 | 51 | 0/20 |
| Ex. 78 | Ex. 58 | 8 | 51 | 0/20 |
| Ex. 79 | Ex. 59 | 8 | 52 | 0/20 |
| Ex. 80 | Ex. 60 | 7 | 52 | 0/20 |
| Comp. Ex. 11 | Comp. Ex. 1 | 16 | 50 | 1/20 |
| Comp. Ex. 12 | Comp. Ex. 2 | 14 | 51 | 1/20 |

In addition, after the measurements of the characteristics, the winding-type aluminum solid electrolytic capacitors of Examples 73 to 80 and Comparative Examples 11 and 12 (ten samples for each Example) were applied to a rated voltage of 35V. They were stored in a standstill state in a constant-temperature bath of 150° C.

After 100 hours, the ESR and the capacitance were measured in the same manner as explained before. The sample was judged as short defectiveness when the leakage current during the storage period exceeded 500 μA. The results are shown in Table 10 in the same manner as Table 4.

TABLE 10

| | Conductive polymer dispersion liquid used | ESR (mΩ) | Capacitance (μF) | Short defectiveness |
|---|---|---|---|---|
| Ex. 73 | Ex. 53 | 11 | 51 | 0/10 |
| Ex. 74 | Ex. 54 | 11 | 51 | 0/10 |
| Ex. 75 | Ex. 55 | 11 | 52 | 0/10 |
| Ex. 76 | Ex. 56 | 9 | 51 | 0/10 |
| Ex. 77 | Ex. 57 | 8 | 51 | 0/10 |
| Ex. 78 | Ex. 58 | 8 | 51 | 0/10 |
| Ex. 79 | Ex. 59 | 8 | 51 | 0/10 |
| Ex. 80 | Ex. 60 | 7 | 52 | 0/10 |
| Comp. Ex. 11 | Comp. Ex. 1 | 24 | 50 | 1/10 |
| Comp. Ex. 12 | Comp. Ex. 2 | 20 | 51 | 1/10 |

As shown in Table 9, the winding-type aluminum solid electrolytic capacitors of Examples 73 to 80 (here, the winding-type aluminum solid electrolytic capacitor is hereinafter simplify referred to as "capacitor.") had lower (smaller) ESR than the capacitors of Comparative Examples 11 and 12, and were free from the occurrence of the leakage current defectiveness unlike the capacitors of Comparative Examples 11 and 12. As shown in Table 10, even after the storage in the constant-temperature bath at 150° C. for 100 hours, the capacitors of Examples 73 to 80 had lower ESR than the capacitors of Comparative Examples 11 and 12. Also, the capacitors of Examples 73 to 80 had little increase of the ESR during the high temperature storage. In addition, there was no short defectiveness unlike the capacitors of Comparative Examples 11 and 12, thereby indicating that the inventive capacitors are reliable at a hot condition.

Evaluation (2)

Tantalum Solid Electrolytic Capacitors

Example 81

In Example 81 and subsequent Examples 82 to 84 and Comparative Examples 13 and 14, tantalum solid electrolytic capacitors were prepared to evaluate their characteristics.

A tantalum sintered body was immersed in a 0.1% phosphorus acid aqueous solution, where it was applied to a conversion treatment by applying a voltage of 35V. Thereby, an oxide layer was formed on the surface of the tantalum sintered body, that is, a dielectric layer, to prepare a capacitor element.

The capacitor element above was immersed in a 35% ethanol solution of 3,4-ethylenedioxythiophene solution. After one minute, it was taken out, and kept still for five minutes. Then, it was immersed in an oxidant and dopant solution as prepared in advance. Here, the oxidant and dopant solution was a mixture of a 50% butylamine phenolsulfonate aqueous solution (pH 5) and a 30% ammonium persulfate aqueous solution at a mass ratio of 1:1. After 30 seconds, it was taken out, and kept still at room temperature for 30 minutes. Then, it was heated at 50° C. for ten minutes for carrying out polymerization. After the polymerization, the capacitor element was immersed in water. After 30 minutes of keeping still therein, it was taken out and dried at 70° C. for 30 minutes. The process above was repeated six times to form a solid electrolyte layer of a conductive polymer on the capacitor element.

As explained above, the capacitor element has formed the solid electrolyte layer of the conductive polymer by means of so-called "on-site polymerization," and then, it was immersed in a conductive polymer dispersion liquid obtained in Example 61. After 30 seconds, it was taken out and dried at 150° C. for 30 minutes. The process above was repeated three times. Then, it was kept still at 150° C. for 60 minutes to form a solid electrolyte layer of a conductive polymer of the present invention. Then, the solid electrolyte layer above was covered with carbon paste and silver paste to obtain a tantalum solid electrolytic capacitor.

Example 82

The conductive polymer dispersion liquid of Example 61 was replaced with a conductive polymer dispersion liquid of Example 62. Except for the replacement, the same procedure as Example 81 was performed to obtain a tantalum solid electrolytic capacitor.

Example 83

The conductive polymer dispersion liquid of Example 61 was replaced with a conductive polymer dispersion liquid of Example 63. Except for the replacement, the same procedure as Example 81 was performed to obtain a tantalum solid electrolytic capacitor.

Example 84

The conductive polymer dispersion liquid of Example 61 was replaced with a conductive polymer dispersion liquid of Example 64. Except for the replacement, the same procedure as Example 81 was performed to obtain a tantalum solid electrolytic capacitor.

Comparative Example 13

The conductive polymer dispersion liquid of Example 61 was replaced with a conductive polymer dispersion liquid of Comparative Example 1. Except for the replacement, the same procedure as Example 81 was performed to obtain a tantalum solid electrolytic capacitor.

Comparative Example 14

The conductive polymer dispersion liquid of Example 61 was replaced with a conductive polymer dispersion liquid of Comparative Example 2. Except for the replacement, the same procedure as Example 81 was performed to obtain a tantalum solid electrolytic capacitor.

With respect to the tantalum solid electrolytic capacitors of Examples 81 to 84 and Comparative Examples 13 and 14, in the same manner as explained before, the ESR and the capacitance were measured. Table 11 shows the kind of the conductive polymer dispersion liquids along with the results. In the measurements of the ESR and the capacitance, ten samples were provided for each Example. The values of the ESR and the capacitance in Table 11 were obtained by averaging the results of the ten samples while rounding off the number of decimal places.

TABLE 11

| | Conductive polymer dispersion liquid used | ESR (mΩ) | Capacitance (µF) |
|---|---|---|---|
| Ex. 81 | Ex. 61 | 14 | 51 |
| Ex. 82 | Ex. 62 | 15 | 51 |
| Ex. 83 | Ex. 63 | 15 | 51 |
| Ex. 84 | Ex. 64 | 13 | 51 |
| Comp. Ex. 13 | Comp. Ex. 1 | 30 | 50 |
| Comp. Ex. 14 | Comp. Ex. 2 | 23 | 51 |

In addition, ten samples of the tantalum solid electrolytic capacitors of each of Examples 81 to 84 and Comparative Examples 13 and 14 were stored at 125° C. for 100 hours. In the same manner as explained before, the ESR and the capacitance were measured. The results are shown in Table 12 in the same manner as Table 11.

TABLE 12

| | Conductive polymer dispersion liquid used | ESR (mΩ) | Capacitance (µF) |
|---|---|---|---|
| Ex. 81 | Ex. 61 | 15 | 51 |
| Ex. 82 | Ex. 62 | 16 | 51 |
| Ex. 83 | Ex. 63 | 16 | 51 |
| Ex. 84 | Ex. 64 | 13 | 51 |
| Comp. Ex. 13 | Comp. Ex. 1 | 67 | 48 |
| Comp. Ex. 14 | Comp. Ex. 2 | 26 | 50 |

As shown in Table 11, the tantalum solid electrolytic capacitors of Examples 81 to 84 (the tantalum solid electrolytic capacitor is hereinafter simply referred to as "capacitor.") had lower ESR than the capacitors of Comparative Examples 13 and 14, indicating that the capacitor characteristics of the invention were superior. As shown in Table 12, even after the storage for 100 hours at 125° C., the capacitors of Examples 81 to 84 had lower ESR than the capacitors of Comparative Example 13-14. Also, the capacitors of Examples 81 to 84 had little increase of the ESR during the high temperature storage, thereby indicating that the inventive capacitors are reliable to be used under a hot condition.

Evaluation of Laminated-Type Aluminum Solid Electrolytic Capacitor

First, Examples 85 to 91 and Comparative Examples 15 and 16 relate to the Preparation Examples of the conductive polymer dispersion liquids to be used in the evaluation of the laminated-type aluminum solid electrolytic capacitors.

Preparation of Conductive Polymer Dispersion Liquid

Example 85

50 g of the conductive polymer dispersion liquid of Example 1 was put into a beaker with a volume of 200 ml having a stirrer. 50 g of pure water was added with stirring. Then, 0.5 g of polyethylene glycol 400 was added. Then, the mixture was adjusted into pH 4.0 with a 28% ammonia aqueous solution. Thereby, a conductive polymer dispersion liquid of Example 85 was obtained.

Example 86

50 g of the conductive polymer dispersion liquid of Example 4 was put into a beaker with a volume of 200 ml having a stirrer. 50 g of pure water was added with stirring. Then, 0.5 g of polyethylene glycol 400 was added. Then, the mixture was adjusted into pH 3.4 with a 28% ammonia aqueous solution. Thereby, a conductive polymer dispersion liquid of Example 86 was obtained.

Example 87

50 g of the conductive polymer dispersion liquid of Example 5 was put into a beaker with a volume of 200 ml having a stirrer. 50 g of pure water was added with stirring. Then, 0.5 g of polyethylene glycol 400 was added. Then, the mixture was adjusted into pH 4.5 with a 28% ammonia aqueous solution. Thereby, a conductive polymer dispersion liquid of Example 87 was obtained.

Example 88

50 g of the conductive polymer dispersion liquid of Example 53 was put into a beaker with a volume of 200 ml having a stirrer. 50 g of pure water was added with stirring. Then, 0.5 g of polyethylene glycol 400 was added. Then, the mixture was adjusted into pH 4.3 with a 28% ammonia aqueous solution. Thereby, a conductive polymer dispersion liquid of Example 88 was obtained.

Example 89

50 g of the conductive polymer dispersion liquid of Example 54 was put into a beaker with a volume of 200 ml having a stirrer. 50 g of pure water was added with stirring. Then, 0.5 g of polyethylene glycol 400 was added. Then, the mixture was adjusted into pH 4.5 with a 28% ammonia aqueous solution. Thereby, a conductive polymer dispersion liquid of Example 89 was obtained.

Example 90

50 g of the conductive polymer dispersion liquid of Example 55 was put into a beaker with a volume of 200 ml having a stirrer. 50 g of pure water was added with stirring. Then, 0.5 g of polyethylene glycol 400 was added. Then, the mixture was adjusted into pH 3.1 with a 28% ammonia aqueous solution. Thereby, a conductive polymer dispersion liquid of Example 90 was obtained.

Example 91

50 g of the conductive polymer dispersion liquid of Example 56 was put into a beaker with a volume of 200 ml having a stirrer. 50 g of pure water was added with stirring. Then, 0.5 g of polyethylene glycol 400 was added. Then, the mixture was adjusted into pH 4.0 with a 28% ammonia aqueous solution. Thereby, a conductive polymer dispersion liquid of Example 91 was obtained.

Comparative Example 15

50 g of the conductive polymer dispersion liquid of Comparative Example 1 was put into a beaker with a volume of 200 ml having a stirrer. 50 g of pure water was added with stirring. Then, 0.5 g of polyethylene glycol 400 was added. Then, the mixture was adjusted into pH 4.5 with a 28% ammonia aqueous solution. Thereby, a conductive polymer dispersion liquid of Comparative Example 15 was obtained.

Comparative Example 16

50 g of the conductive polymer dispersion liquid of Comparative Example 2 was put into a beaker with a volume of 200 ml having a stirrer. 50 g of pure water was added with stirring. Then, 0.5 g of polyethylene glycol 400 was added. Then, the mixture was adjusted into pH 4.6 with a 28% ammonia aqueous solution. Thereby, a conductive polymer dispersion liquid of Comparative Example 16 was obtained.

Then, using the conductive polymer dispersion liquids of Examples 85 to 91 and Comparative Examples 15 and 16, laminated-type aluminum solid electrolytic capacitors were prepared, and properties thereof were evaluated.

Preparation of Laminated-Type Aluminum Solid Electrolytic Capacitor

Example 92

An aluminum etched foil having a size of 10 mm in vertical length and 3.3 mm in lateral length was provided, onto which, in such a manner that it was divided between an area of 4 mm from one end in the direction of the vertical length, and another area of 5 mm from the other end, a polyimide solution was applied in the lateral direction to have a width of 1 mm. Then, it was dried. Then, a positive electrode was attached on the area of 5 mm from said the other end (i.e., "the other end" as explained above) of the vertical direction of the aluminum etched foil. In detail, the positive electrode as a silver line was attached at a portion from 2 mm from said the other end. Also, a dielectric film was formed on the area of 4 mm from said one end (i.e., "one end" as explained above), that is, on the area having a size of 4 mm×3.3 mm. In detail, the dielectric film was formed by using a 10% ammonium adipate aqueous solution to cause a conversion treatment. Thereby, a capacitor element was obtained, which had a set capacitance of more than 25 µF and a set ESR of less than 10 m Ω.

Then, the capacitor element as mentioned above was immersed in the conductive polymer dispersion liquid of Example 85. After one minute, it was taken out and dried at 120° C. for ten minutes. The process above was repeated three times. Then, TAYCATRON KA100 (phenolsulfonate) sold as an antioxidant was dissolved in a mixture of water and ethanol at equal volume ratio, such that it became 5% concentration, into which the capacitor element above was immersed. After one minute, it was taken out and dried at 120° C. for five minutes. Then, the capacitor element above was immersed in the conductive polymer dispersion liquid of Example 14. After one minute, it was taken out and dried at 120° C. for 30 minutes. Then, the conductive polymer layer was covered with carbon paste and silver paste. A silver line as the negative electrode is attached to the point of 3 mm from the longitudinal end. In addition, the outside was provided with an epoxy resin, and then, it was applied to an aging treatment. Thereby, a laminated-type aluminum solid electrolytic capacitor was obtained.

Example 93

The conductive polymer dispersion liquid of Example 85 was replaced with a conductive polymer dispersion liquid of Example 86. In addition, the conductive polymer dispersion liquid of Example 14 was replaced with the conductive polymer dispersion liquid of Example 17. Other than the replacements, the same procedure as Example 92 was performed to obtain a laminated-type aluminum solid electrolytic capacitor.

Example 94

The conductive polymer dispersion liquid of Example 85 was replaced with a conductive polymer dispersion liquid of Example 87. In addition, the conductive polymer dispersion liquid of Example 14 was replaced with the conductive polymer dispersion liquid of Example 18. Other than the replacements, the same procedure as Example 92 was performed to obtain a laminated-type aluminum solid electrolytic capacitor.

Example 95

The conductive polymer dispersion liquid of Example 85 was replaced with a conductive polymer dispersion liquid of Example 88. In addition, the conductive polymer dispersion liquid of Example 14 was replaced with the conductive polymer dispersion liquid of Example 61. Other than the replacements, the same procedure as Example 92 was performed to obtain a laminated-type aluminum solid electrolytic capacitor.

Example 96

The conductive polymer dispersion liquid of Example 85 was replaced with a conductive polymer dispersion liquid of Example 89. In addition, the conductive polymer dispersion liquid of Example 14 was replaced with the conductive polymer dispersion liquid of Example 62. Other than the replacements, the same procedure as Example 92 was performed to obtain a laminated-type aluminum solid electrolytic capacitor.

Example 97

The conductive polymer dispersion liquid of Example 85 was replaced with a conductive polymer dispersion liquid of Example 90. In addition, the conductive polymer dispersion liquid of Example 14 was replaced with the conductive polymer dispersion liquid of Example 63. Other than the replacements, the same procedure as Example 92 was performed to obtain a laminated-type aluminum solid electrolytic capacitor.

Example 98

The conductive polymer dispersion liquid of Example 85 was replaced with a conductive polymer dispersion liquid of Example 91. In addition, the conductive polymer dispersion liquid of Example 14 was replaced with the conductive polymer dispersion liquid of Example 64. Other than the replacements, the same procedure as Example 92 was performed to obtain a laminated-type aluminum solid electrolytic capacitor.

Comparative Example 17

The conductive polymer dispersion liquid of Example 85 was replaced with the conductive polymer dispersion liquid of Comparative Example 15. In addition, the conductive polymer dispersion liquid of Example 14 was replaced with the conductive polymer dispersion liquid of Comparative Example 1. Other than the replacements, the same procedure as Example 92 was performed to obtain a laminated-type aluminum solid electrolytic capacitor.

Comparative Example 18

The conductive polymer dispersion liquid of Example 85 was replaced with a conductive polymer dispersion liquid of Comparative Example 16. In addition, the conductive polymer dispersion liquid of Example 14 was replaced with the conductive polymer dispersion liquid of Comparative Example 2. Other than the replacements, the same procedure as Example 92 was performed to obtain a laminated-type aluminum solid electrolytic capacitor.

With respect to the laminated-type aluminum solid electrolytic capacitors of Examples 92 to 98 and Comparative Examples 17 and 18, in the same manner as explained before, the ESR and the capacitance were measured. Table 13 shows the kind of the conductive polymer dispersion liquids along with the results. Here, regarding the description of the conductive polymer dispersion liquid in Table 13, it is noted that the "conductive polymer dispersion liquid" used is simplified as "dispersion liquid" for the purpose to save the space. Also, in the measurements of the ESR and the capacitance, ten samples were provided for each Example. The values of the ESR and the capacitance in Table 13 were obtained by averaging the results of the ten samples, while rounding off the number of the second decimal place.

TABLE 13

| | First conductive polymer dispersion liquid used | Second conductive polymer dispersion liquid used | ESR (mΩ) | Capacitance (μF) |
|---|---|---|---|---|
| Ex. 92 | Ex. 85 | Ex. 14 | 7.4 | 25.6 |
| Ex. 93 | Ex. 86 | Ex. 17 | 7.2 | 25.4 |
| Ex. 94 | Ex. 87 | Ex. 18 | 7.0 | 25.5 |
| Ex. 95 | Ex. 88 | Ex. 61 | 6.9 | 25.9 |
| Ex. 96 | Ex. 89 | Ex. 62 | 6.9 | 26.0 |

TABLE 13-continued

| | First conductive polymer dispersion liquid used | Second conductive polymer dispersion liquid used | ESR (mΩ) | Capacitance (μF) |
|---|---|---|---|---|
| Ex. 97 | Ex. 90 | Ex. 63 | 6.9 | 26.1 |
| Ex. 98 | Ex. 91 | Ex. 64 | 6.3 | 26.0 |
| Comp. Ex. 17 | Comp. Ex. 15 | Comp. Ex. 1 | 13.2 | 25.2 |
| Comp. Ex. 18 | Comp. Ex. 16 | Comp. Ex. 2 | 19.9 | 24.6 |

In addition, ten samples of the laminated-type aluminum solid electrolytic capacitors of each of Examples 92 to 98 and Comparative Examples 17 and 18 were stored at 125° C. for 100 hours. In the same manner as explained before, the ESR and the capacitance were measured. The results are shown in Table 14 in the same manner as Table 13.

TABLE 14

| | First conductive polymer dispersion liquid used | Second conductive polymer dispersion liquid used | ESR (mΩ) | Capacitance (μF) |
|---|---|---|---|---|
| Ex. 92 | Ex. 85 | Ex. 14 | 7.9 | 25.3 |
| Ex. 93 | Ex. 86 | Ex. 17 | 7.7 | 25.2 |
| Ex. 94 | Ex. 87 | Ex. 18 | 7.3 | 25.2 |
| Ex. 95 | Ex. 88 | Ex. 61 | 7.2 | 25.7 |
| Ex. 96 | Ex. 89 | Ex. 62 | 7.2 | 25.7 |
| Ex. 97 | Ex. 90 | Ex. 63 | 7.2 | 25.8 |
| Ex. 98 | Ex. 91 | Ex. 64 | 6.4 | 25.9 |
| Comp. Ex. 17 | Comp. Ex. 15 | Comp. Ex. 1 | 16.2 | 24.9 |
| Comp. Ex. 18 | Comp. Ex. 16 | Comp. Ex. 2 | 26.9 | 24.3 |

As shown in Table 13, the laminated-type aluminum solid electrolytic capacitors of Examples 92 to 98 (here, the winding-type aluminum solid electrolytic capacitor is hereinafter simply referred to as "capacitor.") had the following features. They had ESR in the range of 6.3 to 7.4 mΩ, satisfying the set ESR that was lower than 10 mΩ. They had a capacitance of 25.4 to 26.1 μF, satisfying the set capacitance that was more than 25 μF. They had lower ESR than the capacitors of Comparative Examples 17 and 18, indicating that they had superior capacitor characteristics. Also, as shown in Table 14, the capacitors of Examples 92 to 98 had the following features. That is, even after the storage for 100 hours at 125° C., they had lower ESR than the capacitors of Comparative Examples 17 and 18, and exhibited less increase of the ESR due to the high temperature storage, thereby indicating that the inventive capacitors are reliable to be used under a hot condition.

Evaluation on Transparent Conductive Film

In this evaluation on a transparent conductive film, the conductive polymer dispersion liquid of the present invention was used to prepare transparent conductive films of Examples 99 to 109. To compare with the above, using a conductive polymer dispersion liquid obtained by synthesized from polystyrene sulfonic acid as a dopant, a transparent conductive film of Comparative Example 19 was obtained. Then, the characteristics thereof were evaluated.

Example 99

600 g of 4% of an aqueous solution of the copolymer of styrenesulfonic acid and hydroxyethyl methacrylate at a mass ratio of 9:1, which was obtained in Production Example 1, were put into a stainless steel container with a volume of 1 L. Therein, 0.3 g of ferrous sulfate 7 hydrate were added as a catalyst, and dissolved. Then, 4 mL of 3,4-ethylenedioxythiophene were dropped slowly. They were stirred with a stirrer spring made of stainless steel. Then, a positive electrode was attached to the container, and a negative electrode was attached to the stirring spring. Then, polymerize electrolytic oxidation was carried out by applying a constant current of 1 mA/cm$^2$ for 18 hours to synthesize a conductive polymer. After the electrolytic oxidation polymerization as mentioned above, the mixture was diluted four times with water. Then, using an ultrasonic homogenizer [manufactured by Nippon Seiki Co., Ltd.; US-T300 (commercial name)], a dispersion treatment was performed for 30 minutes.

Then, 100 g of cation exchange resin [AMBERLITE 120B (commercial name)] manufactured by Organo Corporation was added, and the mixture was stirred for one hour. Then, the mixture was filtered with filter paper No. 131 manufactured by Toyo Roshi Kaisha, Ltd. The treatment by the cation exchange resin and the filtration was repeated three times to remove all the cationic components in the liquid.

Thereby treated liquid was filtered with a filter having a pore size of 1 µm.

Thereby filtered liquid was treated with an ultrafiltration device [VIVAFLOW 200 (product name) made by Sartorius Corporation, in a condition of a molecular weight fraction of 50,000], to remove free components of low molecular weights in the liquid. The processed liquid above was diluted with water to as adjust the concentration of the conductive polymer at 1.5%. To 40 g of the 1.5% liquid, 4 g of propanediol was added as a conductive improver. Thereby obtained was a conductive polymer dispersion liquid in which propanediol was added as a conductive improver. The content of the propanediol therein was 666% with respect to the conductive polymer.

Into the conductive polymer dispersion liquid that had added the propanediol as explained above, added were 9 g of a 20% aqueous solution of sulfonated polyester as a binder [PLASCOAT Z-565 (commercial name) manufactured by Goo Chemical Co., Ltd.], and 20 g of methanol. The mixture was stirred with a stirrer for one hour. Then, it was filtered with filter paper No. 131 made in Toyo Roshi Kaisha, Ltd. to obtain a paint for transparent conductive film.

As a transparent polyester sheet to become a base material at the time of the preparation of the transparent conductive film, used was COSMOSHINE A4300 manufactured by Toyobo Co., Ltd. (commercial name, a thickness: 188 µm; both surface treated with easy adhesion processing; whole light transmittance: 92.3%; haze: 0.9%). Onto the transparent polyester sheet, the paint for transparent conductive film as obtained above was applied by using a bar coater No. 06 (film thickness: 13.74 µm). Then, it was dried at 130° C. for 90 seconds. Thereby obtained was a transparent conductive film formed on the base material of the transparent polyester sheet.

Example 100

The copolymer obtained in Production Example 1 was replaced with the copolymer of styrenesulfonic acid and hydroxyethyl methacrylate at a mass ratio of 8:2 obtained in Production Example 2. Other than the replacement, the same procedure as Example 99 was performed to obtain a paint for transparent conductive film. Since the paint for transparent conductive film in Example 100 was obtained in the same manner as Example 99, it included sulfonated polyester as a binder like Example 99. Also, the copolymer used as a dopant was adjusted into a 4% aqueous solution in the same manner as Example 99, and then, 600 g of the 4% aqueous solution was used. These are the same to the paints for transparent conductive film of Examples 101 to 109 as well as the paints for transparent conductive film of Comparative Example 19.

Then, the paint for transparent conductive film as obtained above was applied to the transparence polyester sheet in the same manner as Example 99, and dried to obtain a transparent conductive film.

Example 101

The copolymer obtained in Production Example 1 was replaced with the copolymer of styrenesulfonic acid and glycidyl methacrylate at a mass ratio of 9:1 obtained in Production Example 4. Other than the replacement, the same procedure as Example 99 was performed to obtain a paint for transparent conductive film. Thereby obtained paint for transparent conductive film was then applied to the transparence polyester sheet in the same manner as Example 99. After drying, a transparent conductive film was obtained.

Example 102

The copolymer obtained in Production Example 1 was replaced with the copolymer of styrenesulfonic acid and hydroxyethyl acrylate at a mass ratio of 9:1 obtained in Production Example 5. Other than the replacement, the same procedure as Example 99 was performed to obtain a paint for transparent conductive film. Thereby obtained paint for transparent conductive film was then applied to the transparence polyester sheet in the same manner as Example 99. After drying, a transparent conductive film was obtained.

Example 103

The copolymer obtained in Production Example 1 was replaced with the copolymer of styrenesulfonic acid and hydroxypropyl methacrylate at a mass ratio of 9.8:0.2 obtained in Production Example 7. Other than the replacement, the same procedure as Example 99 was performed to obtain a paint for transparent conductive film. Thereby obtained paint for transparent conductive film was then applied to the transparence polyester sheet in the same manner as Example 99. After drying, a transparent conductive film was obtained.

Example 104

The copolymer obtained in Production Example 1 was replaced with the copolymer of styrenesulfonic acid and hydroxypropyl methacrylate at a mass ratio of 9.5:0.5 obtained in Production Example 8. Other than the replacement, the same procedure as Example 99 was performed to obtain a paint for transparent conductive film. Thereby obtained paint for transparent conductive film was then applied to the transparence polyester sheet in the same manner as Example 99. After drying, a transparent conductive film was obtained.

Example 105

The copolymer obtained in Production Example 1 was replaced with the copolymer of styrenesulfonic acid and hydroxypropyl methacrylate at a mass ratio of 9:1 obtained in Production Example 9. Other than the replacement, the same procedure as Example 99 was performed to obtain a paint for transparent conductive film. Thereby obtained paint for transparent conductive film was then applied to the transparence polyester sheet in the same manner as Example 99. After drying, a transparent conductive film was obtained.

Example 106

The copolymer obtained in Production Example 1 was replaced with the copolymer of styrenesulfonic acid and 3-methacryloxypropyltrimethoxysilane at a mass ratio of 9:1 obtained in Production Example 10. Other than the replacement, the same procedure as Example 99 was performed to obtain a paint for transparent conductive film. Thereby obtained paint for transparent conductive film was then applied to the transparence polyester sheet in the same manner as Example 99. After drying, a transparent conductive film was obtained.

Example 107

The copolymer obtained in Production Example 1 was replaced with the copolymer of styrenesulfonic acid and vinyltrimethoxysilane at a mass ratio of 9:1 obtained in Production Example 11. Other than the replacement, the same procedure as Example 99 was performed to obtain a paint for transparent conductive film. Thereby obtained paint for transparent conductive film was then applied to the transparence polyester sheet in the same manner as Example 99. After drying, a transparent conductive film was obtained.

Example 108

The copolymer obtained in Production Example 1 was replaced with the copolymer of styrenesulfonic acid and 3-acryloxypropyltrimethoxysilane at a mass ratio of 9:1 obtained in Production Example 12. Other than the replacement, the same procedure as Example 99 was performed to obtain a paint for transparent conductive film. Thereby obtained paint for transparent conductive film was then applied to the transparence polyester sheet in the same manner as Example 99. After drying, a transparent conductive film was obtained.

Example 109

The copolymer obtained in Production Example 1 was replaced with the copolymer of styrenesulfonic acid and p-styryltrimethoxysilane at a mass ratio of 9:1 obtained in Production Example 13. Other than the replacement, the same procedure as Example 99 was performed to obtain a paint for transparent conductive film. Thereby obtained paint for transparent conductive film was then applied to the transparence polyester sheet in the same manner as Example 99. After drying, a transparent conductive film was obtained.

Comparative Example 19

The copolymer obtained in Production Example 1 was replaced with polystyrene sulfonic acid (manufactured by Tayca Corporation; weight average molecular weight: 100,000). Other than the replacement, the same procedure as Example 99 was performed to obtain a paint for transparent conductive film. Thereby obtained paint for transparent conductive film was then applied to the transparence polyester sheet in the same manner as Example 99. After drying, a transparent conductive film was obtained.

With respect to the transparent conductive films of Examples 99 to 109 and Comparative Example 19, the Surface resistance value, the whole light transmittance and the haze (cloud value) were measured. In addition, the adhesion properties with the transparent polyester sheet as the base material (i.e., a crosscut tape peeling test and test for scratch resistance) were examined. The measurement results of the surface resistance value, the whole light transmittance, and haze are shown in Table 15. The measurement results of the adhesion properties are shown in Table 16. Here, in the measurements of the surface resistance value, the whole light transmittance, and the haze, each of the transparent conductive films was cut to have a rectangle shape with a size of 4 cm×8 cm. The details are as follows.

Surface Resistance Value:

LORESTA-GP [MCP-T610 type made by Mitsubishi Chemical Analytech Co., Ltd.; a straight four probe (ASP)] was used to measure it at a temperature of 250° C. In the measurement, ten samples were used for each Example. The surface resistance value shown in Table 15 was obtained by averaging the ten samples sample, while rounding off the number of the decimal place. In the results, as the surface resistance value was smaller, it means that the transparent conductive film had a higher conductivity.

Whole Light Transmittance:

HZ-2P type device manufactured by Suga Test Instruments Co., Ltd. [a double beam type (C light•D65 light)] was used to measure it at a temperature of 25° C. In the measurement, ten samples of each Example was used. The whole light transmittance value shown in Table 15 was obtained by averaging the results of the ten samples while rounding off the number of the second decimal place.

Haze:

HZ-2P type device manufactured by Suga Test Instruments Co., Ltd. [a double beam type (C light, D65 light)] was used to measure it at a temperature of 25° C. In the measurement, ten samples of each Example were used. The haze value shown in Table 15 was obtained by averaging the results of the ten samples while rounding off the number of the second decimal place. In the results, as the haze value became smaller, the transparency was higher.

Crosscut Tape Peeling Test:

A crosscut guide was used in accordance with JIS-K-5600, carrying out the test at a temperature of 25° C., counting the number of the lattices peeled. In Table 16, the number (25) in the denominator is the number of all the lattices to be provided in the crosscut tape peeling test, and the number in the numerator is the number of the lattices peeled in the test.

Scratch Resistance Test (Scrape Resistance Test):

A rubbing tester (load: 100 g, the tip contacting part being covered with gauze, and fixed) was used. The change rate of the surface resistance value was examined when reciprocating it 50 times. Table 16 shows the change rage of the surface resistance value obtained by the calculation formula below. In the results, as the change rate of the surface resistance change was smaller, the adhesion properties were better.

(Change rate of the surface resistance value)=(surface resistance value after the scratch resistance test)÷(the surface resistance value before the scratch resistance test)

TABLE 15

|  | surface resistance value (Ω/sq) | Whole light transmittance (%) | Haze (%) |
|---|---|---|---|
| Ex. 99 | 438 | 87.7 | 0.7 |
| Ex. 100 | 447 | 88.1 | 0.9 |
| Ex. 101 | 426 | 88.0 | 0.8 |
| Ex. 102 | 437 | 88.0 | 0.6 |
| Ex. 103 | 392 | 87.8 | 0.7 |
| Ex. 104 | 403 | 88.0 | 0.7 |
| Ex. 105 | 432 | 87.9 | 0.6 |
| Ex. 106 | 441 | 87.9 | 0.6 |
| Ex. 107 | 438 | 87.9 | 0.6 |
| Ex. 108 | 440 | 87.9 | 0.6 |
| Ex. 109 | 418 | 88.0 | 0.6 |
| Comp. Ex. 19 | 451 | 87.5 | 0.9 |

TABLE 16

| | Adhesion properties | |
|---|---|---|
| | Crosscut Tape Peeling Test | Scratch Resistance Test (Change rate of the surface resistance value) |
| Ex. 99 | 0/25 | 3.1 |
| Ex. 100 | 0/25 | 2.5 |
| Ex. 101 | 0/25 | 2.3 |
| Ex. 102 | 0/25 | 2.3 |
| Ex. 103 | 0/25 | 5.5 |
| Ex. 104 | 0/25 | 3.8 |
| Ex. 105 | 0/25 | 2.4 |
| Ex. 106 | 0/25 | 1.8 |
| Ex. 107 | 0/25 | 1.8 |
| Ex. 108 | 0/25 | 1.8 |
| Ex. 109 | 0/25 | 1.6 |
| Comp. Ex. 19 | 3/25 | 8.2 |

The transparent conductive films of Examples 99 to 109 (hereinafter, such a "transparent conductive film" may be simply referred to as "film.") had the following features. As shown in Table 15, they had a surface resistance value, a whole light transmittance and a haze value (i.e., the indexes of the transparency) in the same level as the film of Comparative Example 19. However, as shown in Table 16, they did not result in the peeling in the crosscut tape peeling test unlike the film of Comparative Example 19. In addition, in the scratch resistant test, they had a change rate of the surface resistance value smaller than that of the film of Comparative Example 19. They had adhesion properties superior to those of the film of Comparative Example 19.

Moisture Heat Resistance Evaluation and Heat Resistance Evaluation of the Transparent Conductive Film Separate from the ones to be used in the measurements of the surface resistance value and the whole light transmittance as explained above, there were provided transparent conductive films of Examples 99 to 109, and Comparative Example 19 (hereinafter, the "transparent conductive film" may be simply referred to as "film."). In the same manner as explained before, after measuring the surface resistance value, the moisture heat resistance test was carried out under the conditions (A) and (B) below.
(A): In a constant temperature and constant humidity system at 65° C. and at a relative humidity of 95%.
(B): In a constant temperature and constant humidity system at 85° C. and at a relative humidity of 85%.

Each sample was stored in a standstill state for 250 hours. After the storage, it was dried at 130° C. for 90 seconds. Then, in the same manner as explained before, the surface resistance value was measured. Then, based on these results, the change rate of the surface resistance value during the storage in the moisture heat resistance test was obtained by the formula below.

(Change rate of the surface resistance value)=(surface resistance value after the moisture heat resistance test)÷(surface resistance value before the moisture heat resistance test)

Also, the heat resistance test was carried out as follows. Separate from the ones to be examined in the moisture heat resistance test as mentioned above, there were provided the films of Examples 99 to 109, and Comparative Example 19. The test was carried out under the condition (C) below.
(C): In an oven at 85° C.

Each sample was stored in a standstill state for 250 hours. In the same manner as explained before, the surface resistance value was measured. Then, a change rate of the surface resistance value during the storage was calculated by the formula below.

(Change rate of the surface resistance value)=(surface resistance value after the heat resistance test)÷(surface resistance value before the heat resistance test)

Then, Table 17 shows the change rates of the surface resistance values of the films in the moisture heat resistance test and the heat resistance test. Here, it is noted that regarding the conditions of the moisture heat resistance test and the heat resistance test, Table 17 simplified describes as follows. This is for the purpose to save the space.
(A): The condition, "in the constant temperature and constant humidity system at 65° C. and at a relative humidity of 95%" is shown as "65° C./95%."
(B): The condition, "in the constant temperature and constant humidity system at 85° C. and at a relative humidity of 85%" is shown as "85° C./85%."
(C): The condition, "In an oven at 85° C." is shown as "85° C."

TABLE 17

| | Change rate of the surface resistance value | | |
|---|---|---|---|
| | moisture heat resistance test | | heat resistance test |
| | 65° C./95% | 85° C./85% | 85° C. |
| Ex. 99 | 1.08 | 1.15 | 1.08 |
| Ex. 100 | 1.05 | 1.08 | 1.06 |
| Ex. 101 | 1.10 | 1.15 | 1.09 |
| Ex. 102 | 1.08 | 1.13 | 1.08 |
| Ex. 103 | 1.16 | 1.28 | 1.15 |
| Ex. 104 | 1.13 | 1.25 | 1.10 |
| Ex. 105 | 1.07 | 1.13 | 1.08 |
| Ex. 106 | 1.05 | 1.07 | 1.06 |
| Ex. 107 | 1.05 | 1.08 | 1.06 |
| Ex. 108 | 1.05 | 1.08 | 1.06 |
| Ex. 109 | 1.04 | 1.06 | 1.05 |
| Comp. Ex. 19 | 1.25 | 1.51 | 1.20 |

As shown in Table 17, the films of Examples 99 to 109 had a lower change rate of the surface resistance value than the film of Comparative Example 19, indicating that the inventive films were superior in the moisture heat resistance and the heat resistance.

The conductive film is required to satisfy the following features. The requirements in the moisture heat resistance test are as follows:
(A) In the storage under the condition at 65° C./95% for 250 hours, the change rate of the surface resistance value should be 1.19 or less.

(B) In the storage under the condition at 85° C./85% for 250 hours, the change rate of the surface resistance value should be 1.40 or less.

The requirement in the heat resistance test is as follows.
(C) In the storage under the condition at 85° C. for 250 hours, the change rate of the surface resistance value should be 1.19 or less.

As shown in Table 17, the films of Examples 99 to 109 satisfied all the requirements of the change rates of the surface resistance values, i.e., the requirement (A) of 1.19 or less, the requirement (B) of 1.40 or less, and the requirement (C) of 1.19 or less.

In contrast, the film of Comparative Example 19 satisfied none of the requirements (A) (B) and (C).

According to the present invention, there can provide a solid electrolytic capacitor with low ESR and that is reliable under a hot condition and that causes less leakage current. In addition, there can provided a conductivity film having high conductivity, superior heat resistance, high transparency.

What is claimed is:

1. A conductive polymer dispersion liquid obtained by a method in which in the presence of a copolymer from styrenesulfonic acid, and at least one kind of a non-sulfonic acid monomer selected from the group consisting of an unsaturated hydrocarbon containing alkoxysilane compound and its hydrolysate, thiophene or its derivative is polymerized by oxidation polymerization in water, or in an aqueous solution comprising a mixture of water and a water miscible solvent to produce the conductive polymer dispersion liquid.

2. The conductive polymer dispersion liquid according to claim 1, wherein in the copolymer, a ratio of said styrenesulfonic acid to said at least one kind of the non-sulfonic acid monomer selected from the group consisting of an unsaturated hydrocarbon containing alkoxysilane compound and its hydrolysate is 1:0.01 to 0.1:1 by mass ratio.

3. The conductive polymer dispersion liquid according to claim 1, wherein said unsaturated hydrocarbon component alkoxysilane compound is at least one selected from the group consisting of 3-methacryloxypropyltrimethoxysilane, 3-acryloxypropyltrimethoxysilane, p-styryltrimethoxysilane and vinyltrimethoxysilane.

4. The conductive polymer dispersion liquid according to claim 1, wherein the derivative of thiophene is 3,4-ethylenedioxy thiophene.

5. The conductive polymer dispersion liquid according to claim 1, wherein the conductive polymer dispersion liquid further comprises a conductive improver selected from the group consisting of a high boiling point organic solvent with a boiling point of 150° C. or more, and saccharide.

6. The conductive polymer dispersion liquid according to claim 1, further comprising a binder.

7. A conductive polymer obtained by drying the conductive polymer dispersion liquid of claim 1.

8. A conductive film made of the conductive polymer of claim 7.

9. A conductive polymer dispersion liquid comprising:
a conductive polymer obtained by a method in which in the presence of component (I), thiophene or its derivative is polymerized by oxidation polymerization in water, or in an aqueous solution comprising a mixture of water and a water miscible solvent, and
a conductive polymer obtained by a method in which in the presence of component (III), thiophene or its derivative is polymerized by oxidation polymerization in water, or in an aqueous solution comprising a mixture of water and a water miscible solvent,
(I) a copolymer from styrenesulfonic acid, and at least one kind of a non-sulfonic acid monomer selected from the group consisting of an unsaturated hydrocarbon containing alkoxysilane compound and its hydrolysate, and
(III): at least one kind of polymer anion selected from the group consisting of sulfonated polyester and phenolsulfonic acid novolac resin.

10. The conductive polymer dispersion liquid according to claim 9, wherein in the copolymer, a ratio of said styrenesulfonic acid to said at least one kind of the non-sulfonic acid monomer selected from the group consisting of an unsaturated hydrocarbon containing alkoxysilane compound and its hydrolysate is 1:0.01 to 0.1:1 by mass ratio.

11. The conductive polymer dispersion liquid according to claim 9, wherein said unsaturated hydrocarbon component alkoxysilane compound is at least one selected from the group consisting of 3-methacryloxypropyltrimethoxysilane, 3-acryloxypropyltrimethoxysilane, p-styryltrimethoxysilane and vinyltrimethoxysilane.

12. The conductive polymer dispersion liquid according to claim 9, wherein the derivative of thiophene is 3,4-ethylenedioxy thiophene.

13. The conductive polymer dispersion liquid according to claim 9, wherein the conductive polymer dispersion liquid further comprises a conductive improver selected from the group consisting of a high boiling point organic solvent with a boiling point of 150° C. or more, and saccharide.

14. The conductive polymer dispersion liquid according to claim 9, further comprising a binder.

15. A conductive polymer obtained by drying the conductive polymer dispersion liquid of claim 9.

16. A conductive film made of the conductive polymer of claim 15.

* * * * *